United States Patent [19]

Scheffel et al.

[11] Patent Number: 5,428,612
[45] Date of Patent: Jun. 27, 1995

[54] SYNCHRONOUS TRANSMISSION SYSTEM

[75] Inventors: Klaus Scheffel; Michael Niegel; Helmut Leuschner, all of Nürnberg, Germany

[73] Assignee: U.S. Philips Corporation, New York, N.Y.

[21] Appl. No.: 86,974

[22] Filed: Jul. 2, 1993

[30] Foreign Application Priority Data

Jul. 9, 1992 [DE] Germany .................. 42 22 546.9
Jul. 9, 1992 [DE] Germany .................. 42 22 547.7

[51] Int. Cl.⁶ .......................... H04J 3/07; H04L 7/00
[52] U.S. Cl. .......................... 370/84; 370/99; 370/102; 370/112; 375/363
[58] Field of Search .............. 370/58.1, 58.2, 58.3, 370/60, 60.1, 79, 82, 83, 84, 94.1, 94.2, 99, 102, 105.1, 110.1, 111, 112, 101; 375/112, 118

[56] References Cited

U.S. PATENT DOCUMENTS

| | | | |
|---|---|---|---|
| 5,119,406 | 6/1992 | Kramer | 370/101 |
| 5,168,494 | 12/1992 | Mueller | 370/112 |
| 5,172,376 | 12/1992 | Chopping et al. | 370/102 |
| 5,210,745 | 5/1993 | Guinand et al. | 370/79 |
| 5,263,056 | 11/1993 | Urbansky | 370/102 |
| 5,265,090 | 11/1993 | Guinand et al. | 370/112 |
| 5,267,239 | 11/1993 | Pospischil et al. | 370/112 |

FOREIGN PATENT DOCUMENTS

| | | |
|---|---|---|
| 4018687 | 1/1991 | Germany . |
| 4108429 | 9/1992 | Germany . |
| 4205959 | 9/1993 | Germany . |

OTHER PUBLICATIONS

CCITT Recommendation G.709.
D. Peer, "Asic-Entwurf mit VHDL und Logiksynthese", Elektronik 23, 1991, pp. 84–92.

*Primary Examiner*—Alpus Hsu
*Attorney, Agent, or Firm*—Anne E. Barschall

[57] ABSTRACT

A synchronous transmission system including a circuit arrangement for determining the data bytes of a signal to be received or to be transmitted. The circuit arrangement includes a control circuit (2, 14) which includes at least a counter (11, 19) for marking the pointer bytes of each high bit rate transport unit that can occur and which circuit arrangement includes at least a counter (6, 17) for marking with a count the data bytes of each high bit rate transport unit that can occur. The control circuit (2, 14) further includes for each group of low bit rate transport units that can occur in each maximum bit rate transport unit that can occur at least a position counter (6, 17), which counter is provided for marking with a count the data bytes in a low bit rate transport unit of the group. The control circuit (2, 14) is additionally provided at least for identifying the payload bytes and the pointer bytes on the basis of the counts and the information about the transport units of the signal.

22 Claims, 8 Drawing Sheets

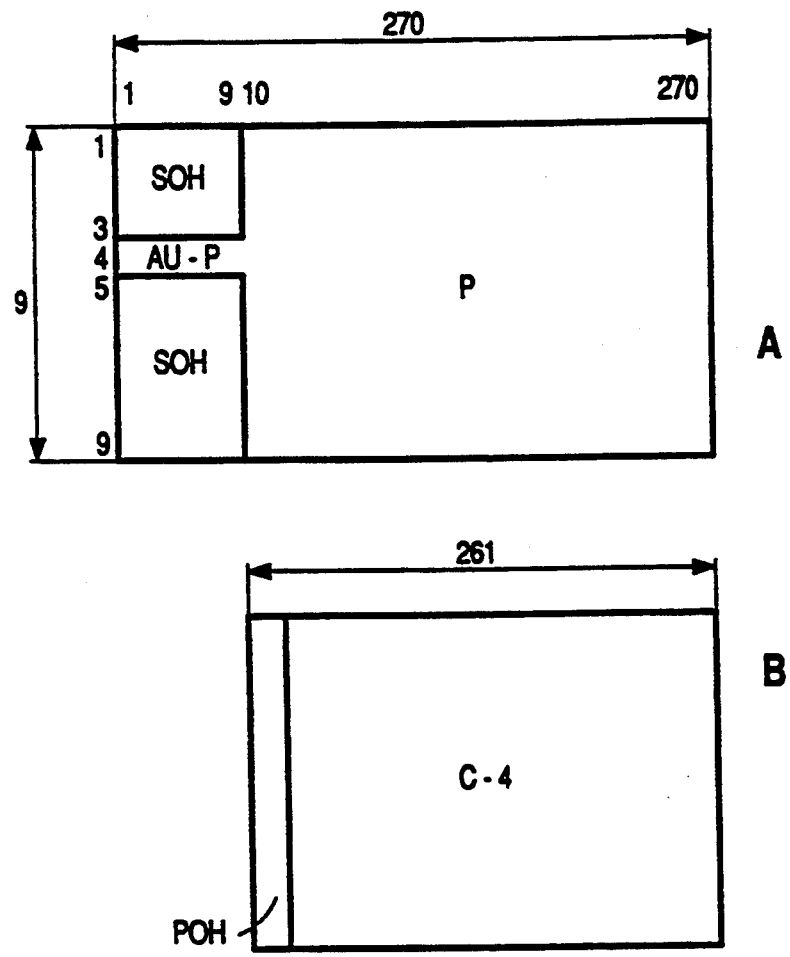
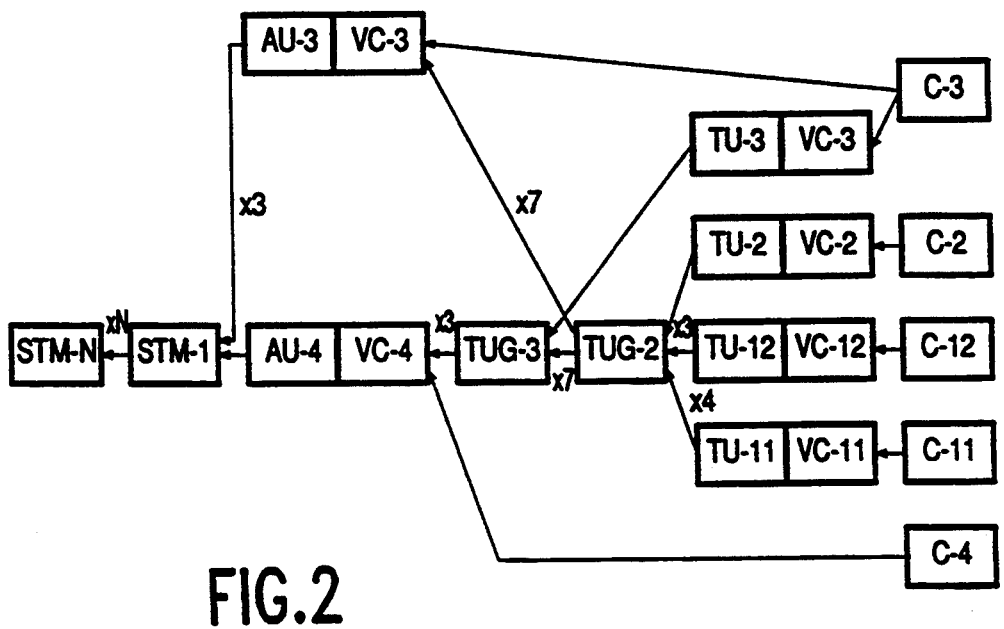
FIG.1
FIG.2

SYNCHRONOUS TRANSMISSION SYSTEM

BACKGROUND OF THE INVENTION

1. Field of the Invention

The invention relates to a synchronous transmission system comprising a circuit arrangement for determining the data bytes of a signal to be received or to be transmitted. Such a synchronous transmission system is meant to imply a system of the Synchronous Digital Hierarchy (SDH) or of a Synchronous Optical Network (SONET).

2. Description of the Related Art

Such a circuit arrangement of a synchronous transmission system is known from German Patent Application P 41 08 429, in which an STM-1 signal of the synchronous digital hierarchy is processed. The synchronous transmission system is used for determining and evaluating pointer bytes and for controlling the writing of data bytes, for example, of a received STM-1 signal. This system is further used for forming pointer bytes and for controlling the reading of the data bytes from the buffer for an STM-1 signal to be transmitted.

The STM-1 signal (Synchronous Digital Hierarchy signal) is structured in frames and comprises, in addition to the actual payload of the signal, control indication bits and justification data, which are referenced data gaps. An STM-1 frame comprises 270 columns and 9 rows (270 bytes per row). The rows 1 to 3 and 5 to 9, in all the columns 1 to 9 carry the Section Overhead (SOH) for overhead and error detection information bytes and the rest of the structure (AU payload) carries data of the signal, justification data and further Overhead bytes.

A plurality of different Containers (C-4, C-3, C-2, C-12 and C-11) can be accommodated in the AU-payload. A container is understood to mean the basic unit for carriage of digital payload. For example, an STM-1 frame can comprise an Administrative Unit AU-4 with a container C-4 for a 139.264 Mbit/sec bit rate. It is alternatively possible that three administrative units AU-3 are accommodated in the STM-1 frame. For example, an administrative unit AU-3 thereof comprises a container C-3 for a 44.736 Mbit/sec bit rate. The second administrative unit AU-3 can comprise, for example, seven Tributary Unit Groups TUG-2s having each a container C-2 for a 6.312 Mbit/sec bit rate. Seven TUG-2s having each three containers C-12 for a 2.048 Mbit/sec bit rate can further be mapped into the third administrative unit AU-3. By appending control indication and justification indication bits to the containers, higher order high bit rate and low bit rate transport units (VC-4, VC-3, TU-3, TU-2, TU-12 and TU-11) are formed. A high bit rate transport unit (VC-4, VC-3) is understood to mean a transport unit that can contain further transport units. A low bit rate transport unit is understood to mean a transport unit that can contain no other transport units.

Said Patent Application has disclosed that each transport unit contained in an STM-1 signal has its own counter for counting the data bytes. For example, when an STM-1 signal with a VC-4, the one that contains only VC-12, is transmitted, the VC-4 and each VC-12 have their own counter. Afterwards the same circuit arrangement cannot be used for transmitting an STM-1 signal with a VC-4 that contains VC-11 until further counters for the VC-4 and for each VC-11 are available. Thus not the same counter as used for the VC-4 containing the VC-12 can be used for the VC-4 containing the VC-11. Every conceivable transport unit configuration in the STM-1 signal thus requires for each occurring transport unit its own counter that cannot be used for another transport unit configuration. Such a circuit arrangement is extremely expensive.

SUMMARY OF THE INVENTION

It is an object of the invention to provide a circuit arrangement of the type mentioned in the opening paragraph which requires little hardware expenditure.

The object is achieved by a synchronous transmission system comprising a circuit arrangement for determining the data bytes of a signal to be received or to be transmitted, of the type mentioned in the opening paragraph, by the following features: The circuit arrangement comprises a control circuit which includes at least a counter for marking the pointer bytes of each high bit rate transport unit that can occur, which comprises at least a counter for marking with a count the data bytes of each high bit rate transport unit that can occur, which comprises for each group of low bit rate transport units that can occur in each maximum bit rate transport unit that can occur at least a position counter, which counter is provided for marking with a count the data bytes in a low bit rate transport unit of the group, and which is provided at least for identifying the payload bytes and pointer bytes on the basis of the counts and the information about the transport units of the signal.

The synchronous transmission system according to the invention comprises a control circuit which includes various counters for determining pointer bytes and data bytes of transport units. For this purpose, at least one counter is available for each high bit rate transport unit (e.g. VC-4 in an STM-1 signal). If three high bit rate transport units VC-3 are transferred in an STM-1 signal, 3 counters are needed. The pointer bytes for the VC-4 or VC-3 respectively, in an STM-1 signal are identified by at least a further counter. For each low bit rate transport unit there is at least one position counter available which marks the data bytes in one or more low bit rate transport units. Such a position counter is then used irrespective of the configuration in the STM-1 signal for a specific type of a low bit rate transport unit or group of low bit rate transport units respectively. For example, one position counter can be used for all the VC-1 ls contained in a TUG-2. The payload bytes and the pointer bytes are identified in the control circuit on the basis of the counts.

Such a control circuit comprises less hardware than the prior-art circuit arrangement and can mark or count respectively, the data bytes of each sort of composition of the transport units.

The measures according to the invention can be implemented for controlling a buffer included in the synchronous transmission system. The control circuit is then provided for writing or reading payload bytes of a signal in or from a buffer,
 assigning each time a write or read counter to a transport unit of the signal,
 forming a buffer address at least from the count of the write or read counter assigned to the payload byte, and
 releasing the buffer in the event of payload bytes.

The control circuit determines the transport units occurring in the signal (for example, STM-1 signal) and assigns, for example, a write counter to each container for writing payload bytes in the buffer. For reading payload bytes from the buffer, a read counter is assigned to each container. The payload bytes contain the actual information of the signal to be transported. The payload byte is stored at a location of the buffer, whose buffer address is formed from at least the write count. Especially with specific low bit rate transport units (TU-2, TU-12, TU-11) the buffer address can be formed from an address assigned to a transport unit and the write count so that a more convenient storing procedure is provided.

A data byte can be written in the buffer only if it is a payload byte. Likewise, only a payload byte is read from the buffer. For determining whether it is a payload byte, the position of each data byte in the signal (for example, STM-1 signal), and in the transport unit to which the payload byte belongs, is determined by the control circuit by means of counters. When a payload byte is to be written in the buffer, the buffer is released to be written. Conversely, when a payload byte is to be mapped into the signal (for example, STM-1 signal), the buffer is released to be read out.

The circuit arrangement of the synchronous transmission system also evaluates the pointer bytes. For this purpose, the control circuit is provided for deducing at least pointer values from the identified pointer bytes or for inserting at least pointer values into the identified pointer bytes.

The control circuit determines the pointer bytes in the signal by means of counters. The so-termed AU-pointer bytes (H1, H2 and H3-pointer bytes) for an administrative unit AU-4 or AU-3, which are transported in the columns 1 to 9 in the fourth row of the STM-1 frame, contain, for example, the information about the beginning of a VC-4 or VC-3 in the AU-payload (rows 1 to 9, columns 10 to 270) and justification indication bytes. At appropriate locations in the AU-payload, the commonly termed TU-pointer bytes (V1, V2 and V3-pointer bytes for TU-2, TU-12 and TU-11 and H1, H2 and H3-pointer bytes for TU-3) are transported. The beginning of a VC-4, VC-3, TU-3, TU-2, TU-12 or TU-11 is contained in the pointer value transported in the pointer bytes.

After the identification, at least the pointer values are deduced from the pointer bytes in the received signal, or at least the pointer values are inserted into the pointer bytes of the signal to be transmitted. Further indication bytes to be transported in the pointer bytes may be similarly deduced or inserted.

In a further embodiment of the invention the control circuit is provided for identifying the AU-payload bytes and AU-pointer bytes, assigning the AU-payload bytes to the individual transport units, identifying the TU-pointer bytes, and identifying the negative justification opportunity as a payload byte when there is a negative justification action and no longer identifying the positive justification opportunity as a payload byte when there is a positive justification action, by evaluation of the counts of the counters.

The assigning of the data to the transport units is effected in the control circuit by evaluation of the counts. Once start bytes have been detected, the AU-payload bytes and the AU-pointer bytes are determined by detection of the counts and then identified. For example, a pointer is set which indicates AU-payload bytes. Furthermore, the AU-payload bytes are additionally apportioned i.e. they are assigned to the transport units whose payload they contain. When there is a positive justification action, no payload is taken from the signal or mapped into the signal. When there is a positive justification action, the payload is omitted. In contrast therewith, payload is transferred at this justification opportunity when there is a negative justification action. Such a justification action is to be determined during the writing operation by evaluation of the pointer bytes. Once the pointer bytes have been evaluated, there can be established whether there are payload bytes at this justification opportunity. During the reading operation the justification decision circuit—known from, for example, German Patent Application P 41 08 429—indicates whether a justification action is to be performed.

For determining the position of the AU-pointer bytes in the signal, the control circuit comprises at least one counter provided for counting the AU-pointer bytes. When specific counts are reached, the control circuit is further provided for forming a pointer identification for an AU-pointer byte, or a possible justification opportunity. The pointer identification identifies a data byte as a pointer byte or as a possible positive or negative justification opportunity. With a positive justification action the payload is omitted. This is understood to mean that the next data byte after the AUpointer bytes does not contain payload. In contrast herewith, payload is transferred at this justification location when there is a negative justification action. The H3-pointer byte would comprise a payload byte in that case.

For determining the position of the TU-pointer bytes in the signal, the control circuit comprises at least one counter circuit provided for counting the data bytes in the AU-payload. By evaluating the counts of the counter circuit, the control circuit determines the position of the data bytes in the AUpayload structure assigns the data bytes to the TU-transport units and form a pointer identification for a TU-pointer byte or a possible justification byte. The counter circuit determines the position of the data bytes in the AU-payload structure in that it assigns a TU-3, TU-2, TU-12 or TU-11 CFU Transport Units) to the data bytes and determines in the TU transport units the positions of the data bytes and thus the positions of the pointer bytes and of possible justification bytes by the detection of at least one count.

An embodiment for the counter circuit comprises at least a column counter for determining the column and at least a row counter for determining the row in each VC-4 or VC-3, a position counter for at least a TU-3 for identifying the payload bytes in a TU 3, a counter for identifying TUG-2, at least a counter for identifying TU-12 in at least a TUG-2, at least a counter for identifying TU-11 in at least a TU-11 and at least a position counter for at least each TU-2, TU-12 and TU-11 for identifying the payload bytes in a TU-2, TU-12 and a TU-11.

In an administrative unit AU-3 containers C-3, C-2, C-12 and C-11 can be carried. The higher order Tributary Units TU-2, TU-12 and TU-11 are mapped into tributary unit groups TUG-2. For detecting the valid data bytes and the pointer bytes and any available fixed and variable justification locations in such a transport unit TU, there are always column and row counters, counters for identifying TUG-2, TU-12 and TU-11 and position counters for TU-2, TU-12 and TU-11 available. It is then only necessary, always in a TUG-2, to determine how the data bytes have been distributed. Similarly, only the contents of a TU-2, TU-12 or TU-11 to be transported in the TUG-2 are to be detected. It is alternatively possible and more expensive to use for each possible container its own counter. The counter circuit thus determines either for an administrative unit AU-4 or AU-3 each conceivable constellation of transport units and thereto determines the payload bytes by means of the position counters and, for example, fixed justification locations by means of the column and row counters.

The position counter for a tributary unit TU-3 is not required for identifying the contents of an AU-3. A TU-3 can only be transported in an administrative unit AU-4. In order to have a simple counter circuit and use same for the two administrative units AU-3 and AU-4, this position counter is also present for an AU-3. For the three administrative units AU-3 to be transported in an STM-1 frame, three such counter circuits are necessary. For utilizing these three counter circuits also for an administrative unit AU-4, an AU-4 may be subdivided into three structures which have alternating columns. The counter circuit used in the invention, compared with the state of the an counter circuit, comprises a considerably smaller number of counters.

An addressing circuit included in the control circuit is used for forming a buffer address, which addressing circuit is provided for
- forming the buffer address from the count of each assigned write or read counter when there is a VC-4 or a VC-3,
- forming the buffer address from the count of each assigned write or read counter when there is a TU-2 and from the count of the counter for the identification of TUG-2, and
- forming the buffer address from the count of each assigned write or read counter when there is a TU-12 or TU-11, and from the count of the counter for the identification of TUG-2 and from the count of the counter for the identification of TU-12 or TU-11.

Thus, in the addressing circuit first determines to which transport unit the payload byte belongs. If there is a payload byte of a virtual container VC-4 or VC-3, the buffer address is taken from the count of each write or read counter assigned to the virtual container, which are each modulo counters. The value of the modulo counters depends on the necessary buffer depth i.e. which shifts with time, between the writing and reading operations are to be compensated. With a TU-2 the buffer address is formed from the count of the counter for the identification of TUG-2 and from the count of the assigned write or read counter. The most significant bits of the buffer address are then formed by the count of the counter for the identification of the TUG-2 and the less significant bits from the count of the write or read counter. Additionally, the count of the counters for the identification of TU-12 or TU-11 is added to the most significant bits of the buffer address for the TU-12 or TU-11.

In a further embodiment of the invention the control circuit comprises a pointer circuit which is provided for deducing a part of a pointer value from the pointer bytes or for inserting a part of a pointer value into the pointer bytes when there is a pointer identification for the H1 or V1 and H2 or V2-pointer bytes respectively. The pointer circuit thus detects at least the pointer identification for an H1, H2, V1 or V2-pointer byte and deduces and inserts respectively, each time the portions from which the pointer value is made, from or into respectively, the H1, H2, V1 or V2-pointer bytes.

The actual pointer value is always formed while the hitherto actual pointer value is known. The actual pointer value is understood to mean the pointer value which denotes the beginning of the transport unit concerned. Therefore, a pointer memory in the pointer circuit is provided at least for storing a pointer value at a memory location identified by a pointer address to be formed by the addressing circuit included in the control circuit. Fixed predetermined pointer addresses are produced for the VC-4 and VC-3, pointer addresses depending on the counter for identifying a TUG-2 are produced for the TU-2, and pointer addresses depending on the counter for identifying a TUG-2 and depending on each counter for identifying a TU-12 or TU-11 are produced for the TU-12 or TU-11.

In the received signal the actual pointer value for a transport unit TU is formed by evaluation of the hitherto actual, the newly received and the last-received pointer value. When the newly received pointer value and the last-received pointer value correspond and when the hitherto actual pointer value and the new pointer value do not correspond, the pointer circuit is at most provided for setting the newly received pointer value as the actual pointer value. Otherwise the hitherto actual pointer value continues to be the actual pointer value.

A justification action is performed, for example, in a TU-transport unit TU-2, TU-12 and TU-11 starting with the V-3 pointer byte. If a justification action is to be performed, the beginning of the TU-transport unit is shifted by one data byte. This means that the TU-pointer value is decremented or incremented by unity. If after evaluation of the V1 and V2-pointer bytes of the TU-transport units TU-2, TU-12 or TU-11 the pointer value designates the beginning of the container concerned, which lies between the V2 and V3-pointer byte, there is a shift before the actual justification opportunity. The same holds for the administrative units AU-4 and AU-3. For avoiding a shift of the actual justification opportunity, the pointer circuit, when there is a positive or negative justification action, will not increment or decrement the pointer values until the occurrence of the H3 or V3-pointer bytes of a transport unit. For the counters of the counter circuit to have a common reference point to the frame of the received signal of the synchronous digital hierarchy, the counters of the counter circuit are initialized each time at the beginning of an AU-4 or AU-3 administrative unit.

German Patent Application P 42 05 959 has disclosed a circuit arrangement for equalizing frequency and/or phase variations between an arriving and a departing signal containing an AU-payload byte and other data bytes. The circuit arrangement comprises a cache memory for buffering the payload bytes and an AU-pointer code which marks the beginning of an AU-pointer, and a control circuit which produces a blocking signal in the case of a justification. A justification occurs in the event of frequency and/or phase variations and with the SOH data of the STM-1 frame. Thus when no payload bytes are read from the cache memory, the blocking signal occurs.

The control circuit of the circuit arrangement according to the invention for the evaluation of pointer bytes of the received STM-1 signal, receives a blocking signal when there are no AU-payload bytes and, when a blocking signal occurs, produces a pointer for designating the absence of payload bytes. The blocking signal is supplied, for example, by the cache memory known from German Patent Application P 42 05 959. The pointer shows whether there are AU payload bytes. Furthermore, a position counter for counting the AU-payload bytes is present, which interrupts the counting operation when the blocking signal occurs. This position counter is necessary for determining the AU-pointer bytes.

If the actual pointer value corresponds to the contents of the associated position counter, the control circuit is provided for issuing an indicator each time for the beginning of an AU-4, AU-3, TU-3, TU-2, TU-12 or TU-11. For example, if the count of the AU-position counter is equal to the pointer value of the appropriate administrative unit AU-3 or AU-4, an indicator is issued which can be buffered in a buffer used for buffering the payload bytes of the STM-1 signal and for allocating the time-order for the reading of the payload bytes.

The control circuit comprises an AU-pointer counter to find out when AU-pointers occur. The control circuit receives an AU-pointer code for identifying the beginning of the AU-pointer. This AU-pointer code initializes the AU-pointer counter for counting the AU-pointer bytes. The AU-pointer code may be provided by the cache memory known from German Patent Application P 42 05 959.

The circuit arrangement of the synchronous transmission system, which forms a signal to be transmitted, receives an indicator for the beginning of an AU-4, AU-3, a TU-3, TU-2, TU-12 or TU-11 from a buffer used for buffering payload bytes. When an indicator is supplied for the beginning of an AU-4, AU-3, a TU-3, TU-2, TU12 or TU-11, the pointer circuit is provided for forming the actual pointer value from the count of the associated position counter. If a positive or negative justification action is to be carried out, the pointer circuit will increment or decrement the actual pointer value.

For the synchronous digital hierarchy signal to be transmitted, a control circuit is necessary which additionally includes a send frame counter circuit with a column counter for determining the column and a row counter for determining the row in the frame synchronized signal of the synchronous digital hierarchy (STM-1 signal). The column counter and the row counter are necessary for initializing the counters of the counter circuit (generation of a common reference point). The counters of the counter circuit are initialized each time at the beginning of the 9$^{th}$ column and the 4$^{th}$row in the STM-1 frame. Furthermore, the column counter and the row counter in the send frame counter circuit are used for determining pointer identifications for the AUpointer bytes.

BRIEF DESCRIPTION OF THE DRAWINGS

Exemplary embodiments for the invention will be further explained hereinafter with reference to the drawing Figures, in which:

FIG. 1 gives a diagrammatic representation of the STM-1 frame with a VC-4 container, FIG. 2 shows a multiplexing structure of the STM-1 signal.

DETAILED DESCRIPTION OF THE PREFERRED EMBODIMENTS

Transmission systems transmitting signals of the synchronous digital hierarchy comprise regenerator circuits in which matching circuits cancel frequency and phase variations between an incoming and an outgoing signal. With such a transmission system, for example, an STM-1 signal is transmitted. This STM-1 signal is structured in frames and further explained in CCITT Recommendation G.709. In the following the parts of the STM-1 frame structure essential to the invention will be explained.

The structure of an STM-1 frame is shown schematically in FIG. 1a. The frame comprises 270 columns and 9 rows (270 bytes per row). The rows 1 to 3 and 5 to 9 all in the columns 1 to 9 carry the Section Overhead (SOH) for overhead and error detection information, the fourth row of columns 1 to 9 carries the AU-pointer (AU-p) and the actual payload, the AU-payload or the AU-payload structure (P). As is shown in FIG. 1b the payload structure carries, for example, a virtual container VC-4 which comprises a C-4 payload and a Path Overhead (POH). A container is here meant to denote the basic unit for carriage of payload bytes. Such a container may carry further containers.

A multiplexing structure for the STM-1 frame is shown in FIG. 2. Data of a valid signal having a 44.736 Mbit/sec bit rate are mapped into a container C-3. By appending a POH the C-3 container is made into a virtual container VC-3. By appending pointer bytes, justification bytes and further bytes the virtual container VC-3 becomes a tributary unit TU-3 or an administrative unit AU-3. Three administrative units AU-3 are mapped into one STM-1 frame.

Data of a valid signal having a 6.312 Mbit/sec bit rate are mapped into a container C-2, data of a valid signal having a 2.048 Mbit/sec bit rate are mapped into a container C-12 and data of a valid signal having a 1.44 Mbit/sec bit rate are mapped into a container C-11. The containers C-2, C-12 and C-11 become virtual containers VC-2, VC-12 and VC-11 each time when a POH is appended. Once the virtual containers VC-2, VC-12 and VC-11 have been completed by justification bytes and further bytes, they become tributary units TU-2, TU-12 and TU-11. The TU-2, TU-12 and TU-11 are combined into a tributary unit group TUG-2. A TUG-2 carries one TU-2 or three TU-12s or four TU-11s.

Seven TUG-2s can be mapped into a VC-3 or seven TUG-2s into a TUG-3. In the former case a POH is appended and in the latter case further bytes and justification bytes. Three TUG-3s are mapped into one VC-4 which further includes a POH, further bytes and justification bytes. As has already been observed hereinbefore, a container C-4 may also be mapped into the VC-4. The VC-4 is mapped into an AU-4 (also denoted administrative unit group AU-4) which, compared with the virtual container VC-4, additionally includes an AU-pointer. This AU-4 together with the SOH then forms the STM-1 frame. By multiplexing the STM-1 frame, higher order STM-1 frames (STM-N) are formed.

Figure 3:
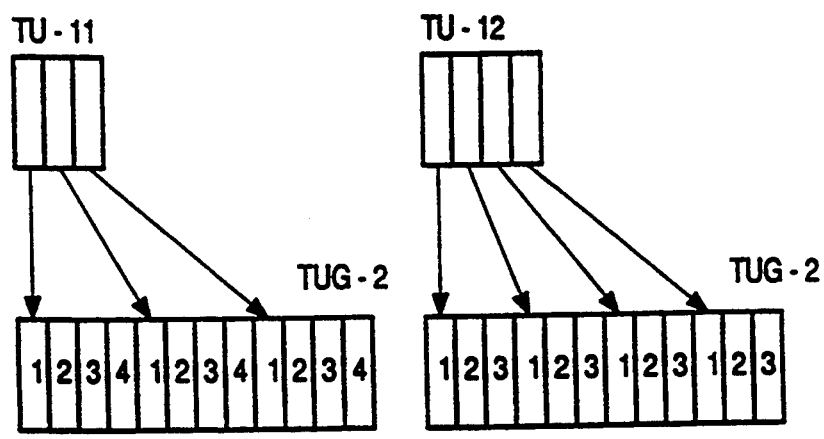
FIG. 3 shows the multiplexing structure of tributary units TU-11, TU-12 respectively, in a tributary unit group TUG-2.

FIG. 3 clarifies the multiplexing of four TU-11s and three TUG-12s respectively, into one TUG-2. The bytes of a column of a TU-11 and a TU-12 respectively, are alternately mapped into a TUG-2.

Figure 4:
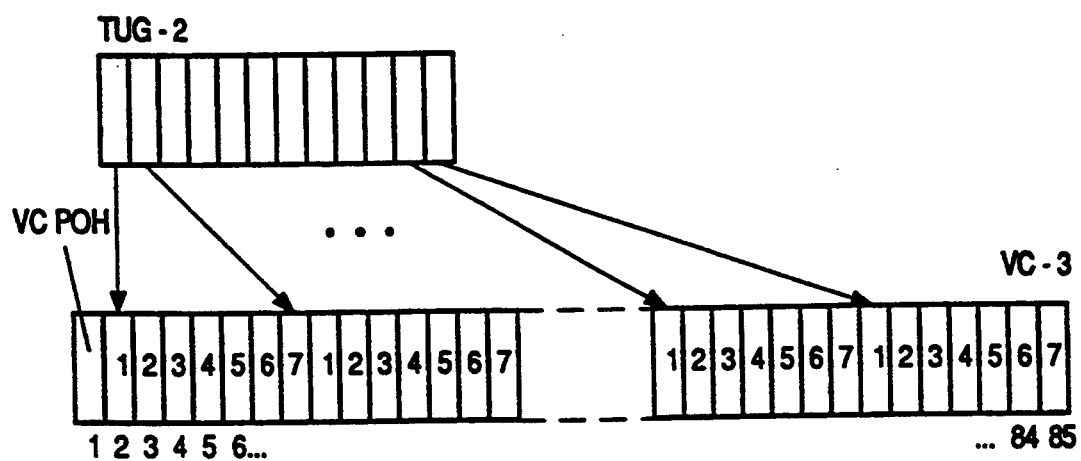
FIG. 4 shows the multiplexing structure of tributary unit groups TUG-2 in a virtual container VC-3.
Figure 5:
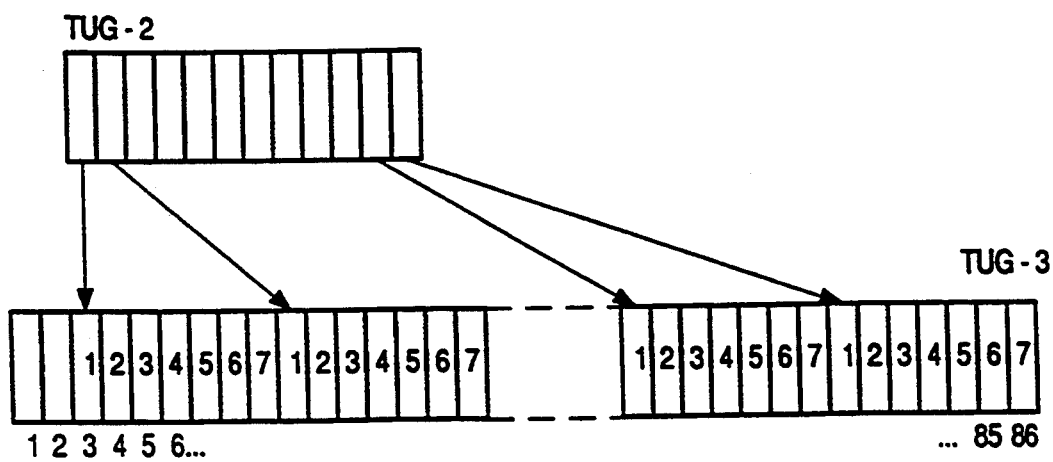
FIG. 5 shows the multiplexing structure of tributary unit groups TUG-2 in a tributary unit group TUG-3.

FIG. 4 shows the multiplexing structure for mapping seven TUG-2s into one VC-3. The first column of the VC-3 carries a POH. Alternately, the bytes of the columns of a TUG-2 are mapped into the next columns of the VC-3. A similar multiplexing structure is shown in FIG. 5 for the multiplexing structure of seven TUG-2s into one TUG-3. However, the first two columns are then reserved to fixed justification bytes.

Figure 6:
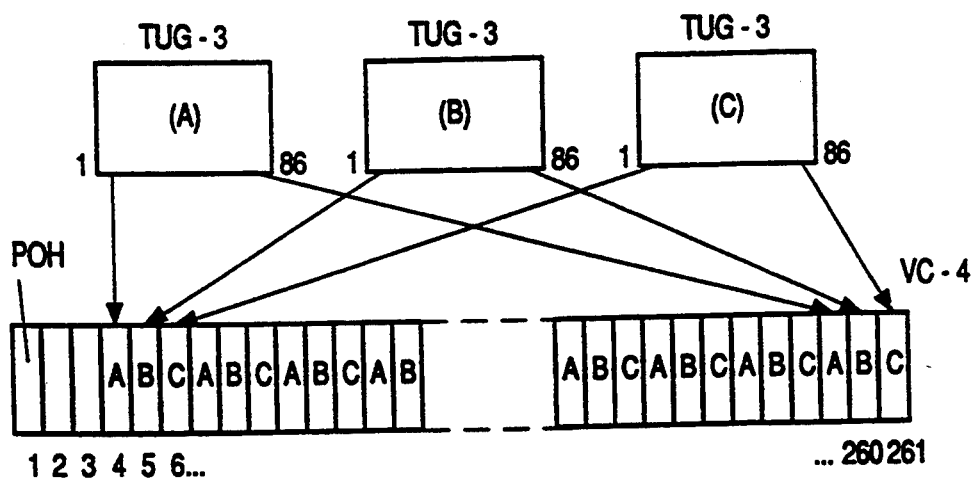
FIG. 6 shows the multiplexing structure of tributary unit groups TUG-3 in a virtual container VC-4.

The multiplexing structure of three TUG-3s into one VC-4 is shown in FIG. 6. The first three columns of the VC-4 carry a POH and fixed justification bytes. The remaining columns of the VC-4 alternately carry columns of the respective TUG-3s.

Figure 7:
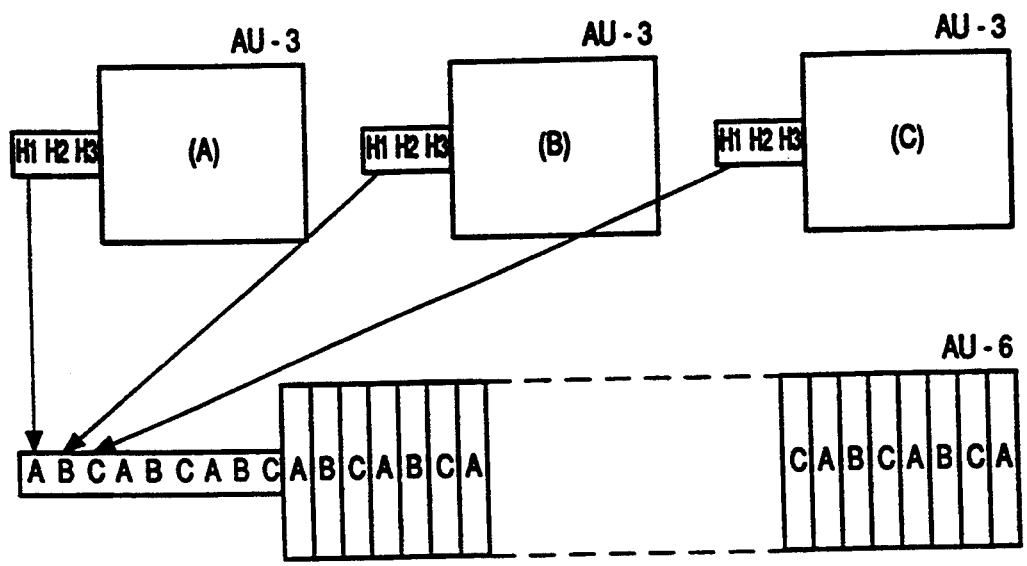
FIG. 7 shows the multiplexing structure of administrative units AU-3 in an administrative unit group AU-4, FIG. 8 gives a diagrammatic representation of an administrative unit AU-4 having pointer locations for tributary units TU-3, FIG. 9 gives a diagrammatic representation of a multiplex frame with pointer locations for the viral containers VC-11, VC-12 and VC-2.

The multiplexing of three AU-3s with the appropriate AU-pointer is shown in FIG. 7. The AU-pointer of each AU-3 is alternately carried in the AU-pointer of the STM-1 frame. The bytes of each column of an AU-3 are also alternately carried in one AU-4.

Figure 8:
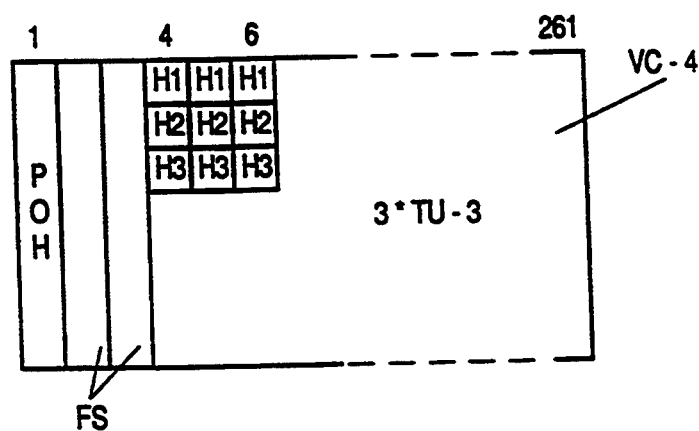
Figure 9:
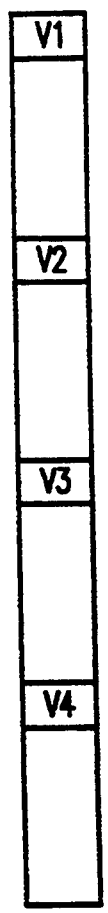

Each AU-3 and AU-4 and each TU-3, TU-2, TU-12 and TU-11 comprises a pointer. The pointers are mapped at fixed given locations. They designate the beginning of the appropriate virtual container and may contain justification data. The position of the pointers for the AU-4 and AU-3 will be clear from FIG. 1 and FIG. 7. The position of the pointers for TU-3 is apparent from FIG. 8. The pointers H1, H2 and H3 are carried for each of the three TU-3s in a VC-4 in the columns 4 to 6 of the VC-4, rows 1 to 3. The first column of the VC-4 carries a POH and the second and third columns of the VC-4 accommodate fixed justification bytes FS if three TU-3s are mapped into one VC-4.

A TU-2, TU-12 or TU-11 is transported in four consecutive STM-1 frames. The first frame of a tributary unit carries on the first byte position the pointer V1, the second frame on the first byte position the pointer V2, the third frame on the first byte position the pointer V3 and the fourth frame on the first byte position the pointer V4. In the third frame there may be a positive justification opportunity at the second byte position. Furthermore, 26 bytes of a virtual container VC-11, 35 bytes of a virtual container VC-12 and 107 bytes of a virtual container VC-2 are transported per frame.

Figure 10:
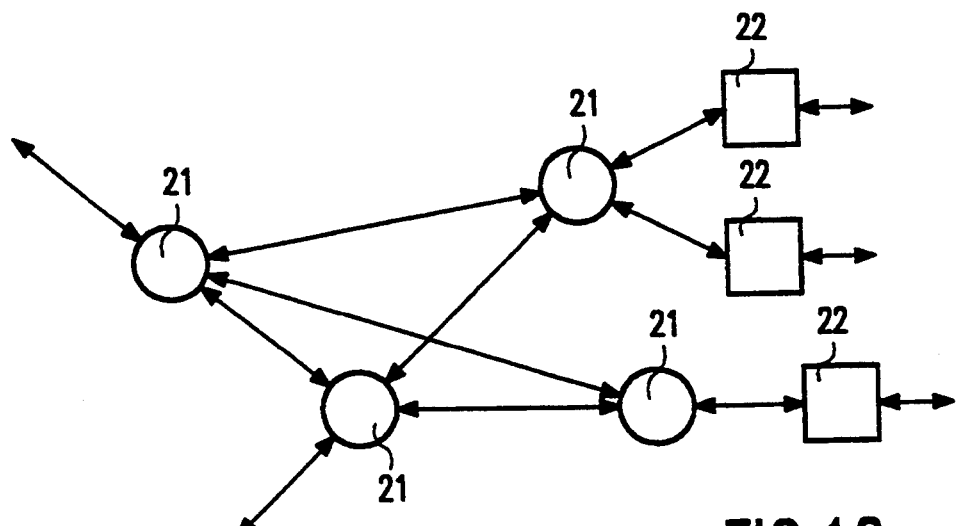
FIG. 10 shows an exemplary embodiment of a synchronous transmission system.

An exemplary embodiment for a synchronous transmission system, for example, a system of the Synchronous Digital Hierarchy (SDH) or a Synchronous Optical Network (SONET) is shown in FIG. 10. This embodiment comprises a plurality of transmission devices 21 which are coupled partly by means of connections. Such a transmission device 21 receives and sends out, for example, at least an STM-1 signal. Furthermore, the transmission device 21 can receive signals from interface circuits 22 or send signals thereto. Such an interface circuit 22 also receives signals of transport units of an STM-1 signal. In the interface circuit 22 this STM-1 signal is written in a buffer of a matching circuit, for example, for the signal clock to be matched.

Figure 11:
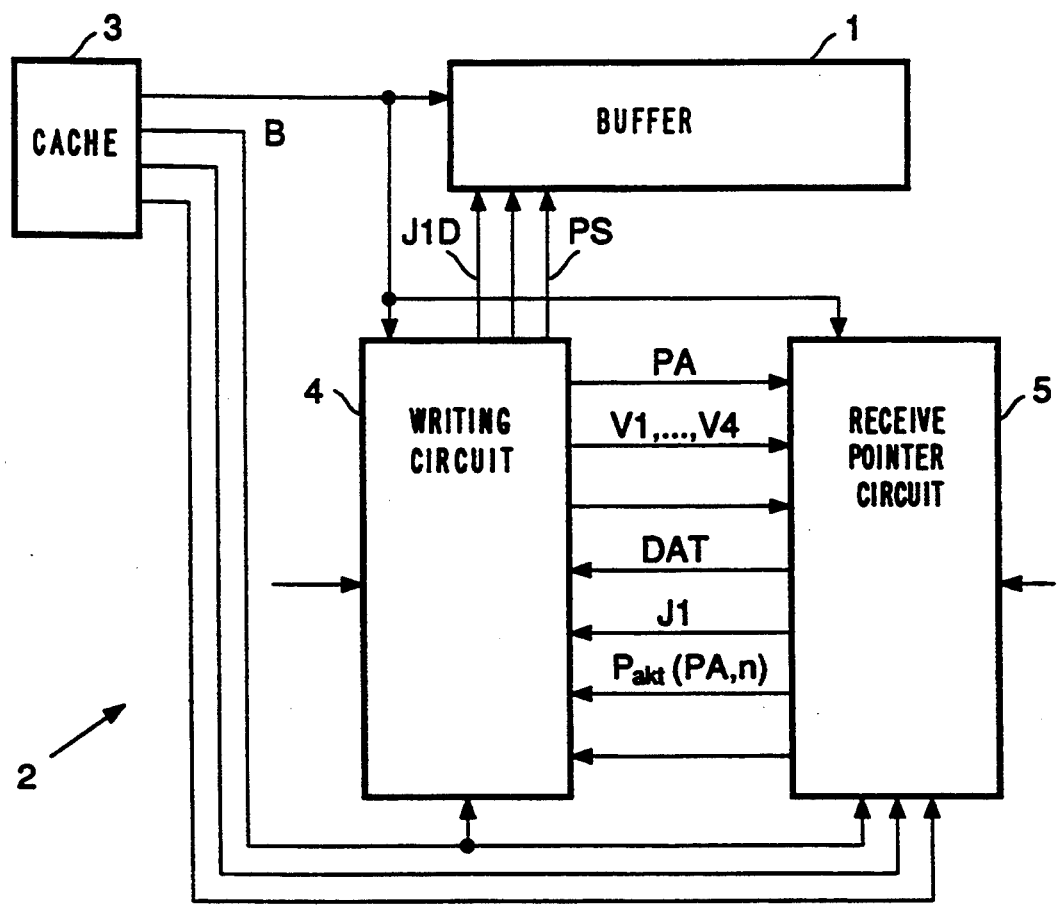
FIG. 11 shows a first exemplary embodiment for a circuit arrangement according to the invention.

A first embodiment of a circuit arrangement of the synchronous transmission system as shown in FIG. 10, which forms part of a matching circuit and processes STM-1 signals, is schematically shown in FIG. 11. A buffer 1 is controlled by a receive control circuit 2 and receives therefrom a write command, an indicator value J1D and a buffer address PS. The receive control circuit 2 is further coupled to a circuit arrangement 3 (to be referenced cache memory in the following) for cancelling frequency and/or phase variations between an incoming and an outgoing signal. This cache memory 3 is known from German Patent Application P 42 05 959. It feeds data bytes to the buffer 1 and to the receive control circuit 2. Furthermore, it supplies a blocking signal to the receive control circuit 2 if no data bytes are read from the buffer circuit 3. The receive control circuit 2 receives from the cache memory 3 an additional AU-pointer code which identifies the beginning of the AU-pointer and a structure code B. Each AU-3 and each associated AU-pointer are alternatively mapped into the STM-1 frames. Consequently, there are three structures alternately showing up in the STM-1 frame. For identifying a structure the cache memory 3 supplies the structure code B which is also used in the receive control circuit 2 for the evaluation of the payload structure. The information about which containers are transported in the STM-1 signal is supplied by a management memory of the system management which is not further shown here.

The receive control circuit 2 comprises a writing circuit 4 and a receive pointer circuit 5 which also receive data bytes from the cache memory 3. The receive pointer circuit 5 indicates whether AU-payload bytes are present. In this case the indicator DAT is set to 1. Furthermore, the pointer circuit 5 applies a J1 identification to the writing circuit 4, which identifies whether the payload byte to be written into the buffer 1 is the start of a VC-4 or of a VC-3 in an AU-3. The writing circuit 4 further receives from the receive pointer circuit 5 the pointer value $P_{akt}(B,n)$ with each supplied container and the indication whether a positive or a negative justification action is concerned. The receive pointer circuit 5 comprises a pointer memory in which pointer information signals of preceding STM-1 frames are stored. The writing circuit 4 supplies to the receive pointer circuit 5 the pointer address PA going with each supplied container. In addition, the writing circuit 4 supplies pointer identifications V1, ..., V4 to the receive pointer circuit 5, which identifies each time that there may be a justification location and pointer bytes available. Finally, it supplies a TU-code to the receive pointer circuit 5, which indicates to which tributary unit the data byte supplied by the cache memory 3 belongs.

It should further be observed that clock signal connections have not been indicated and described in FIG. 11 and thereafter for clarity.

Figure 13:
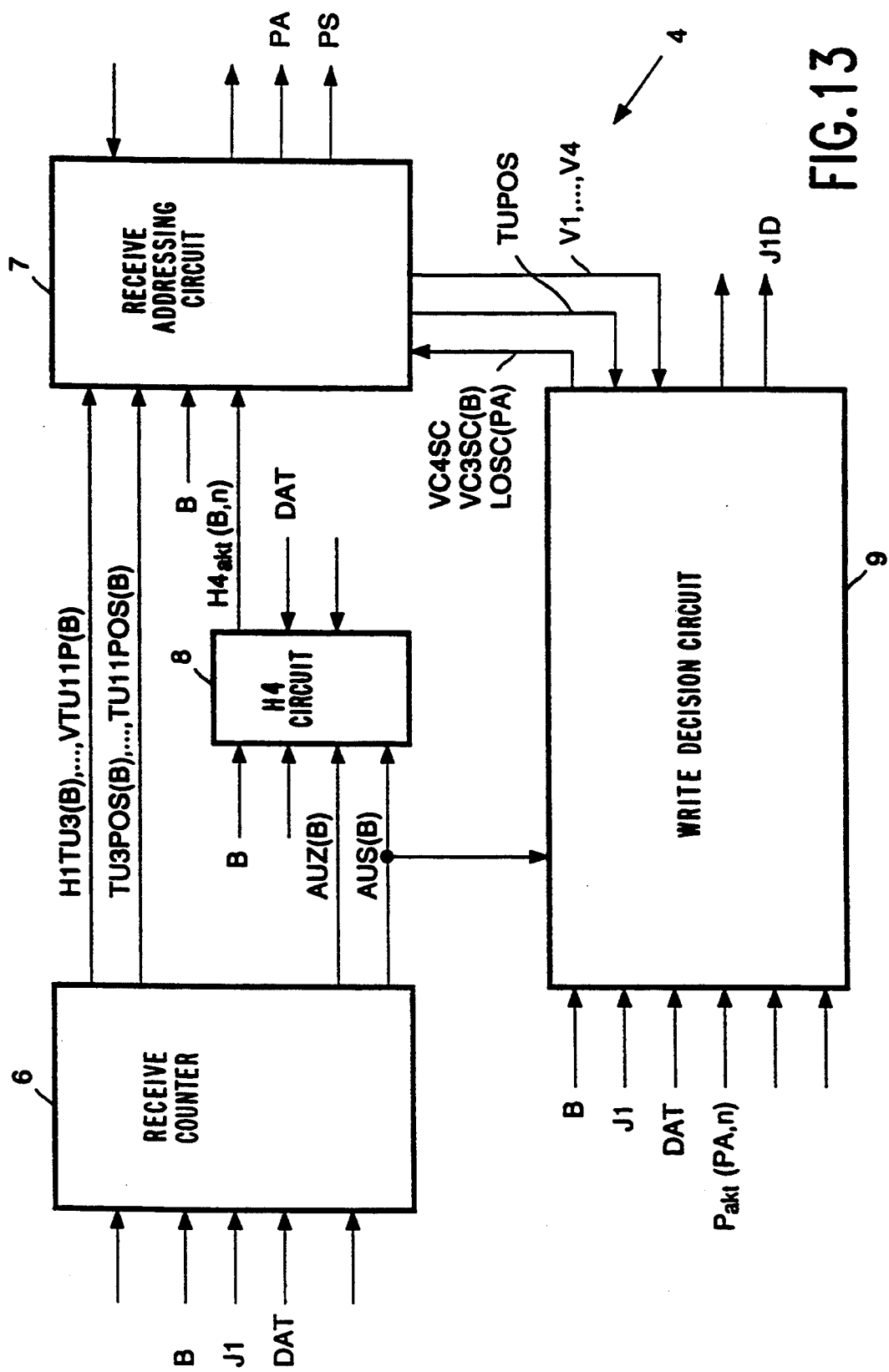
FIG. 13 shows a block diagram of a writing circuit included in the circuit arrangement as shown in FIG. 11.

FIG. 13 shows a block diagram of the writing circuit 4. The circuit contains a receive counter circuit 6, a receive addressing circuit 7, an H4-circuit 8 and a write decision circuit 9. The receive counter circuit 6 comprises three counter stages assigned to a structure. Each counter stage comprises a column counter AUS(B) for counting the columns in an AU-3 or AU-4 respectively, a row counter for counting the rows in an AU-3, AU-4 respectively. For each structure a counter TUG2(B), a counter TU11(B) and a counter TU12(B) is present. The counter TUG2(B) determines to which TUG-2 the available data byte is to be assigned, when a TUG-2 is transported in the structure. The counter TU12(B) determines for a structure, to which TU-12 the data byte is to be assigned when a plurality of TU-12s have been mapped into the TUG-2. The same is effected for a TUG-2 for a structure for a TU-11 with a counter TU11(B).

Furthermore, four position counters TU3POS(B), TU2POS(B), TU12POS(B) and TU11POS(B) are present which determine each the position of a payload byte in the associated TU-3, TU-2, TU-12 and TU-11 when such a transport unit is used. On the basis of the various counts the receive counter circuit 6 sets various pointer indicators (H1TU3(B), H2TU3(B), H3TU3(B) and H3TU3P(B) for a TU-3; VTU2(B), VTU2P(B) for a TU-2; VTU11(B) and VTU11P(B) for a TU-11; VTU12(B) and VTU12P(B) for a TU-12), which indicate that the available data byte may be a pointer byte or a justification byte.

The position counts are supplied to the receive addressing circuit 7. The count of the column counter AUS(B) is applied to the H4-circuit 8 and to the write decision circuit 9 and the count of the row counter AUZ(B) is applied to the H4-circuit 8. Furthermore, the receive counter circuit 6 receives data bytes and the structure code B from the cache memory 3 and the indicator DAT and the J1-identification from the receive pointer circuit 5. It produces two TU-indicators TU3D(B) and TUG2D(B) for each structure, which identify when a TU-3 or a TUG-2 is present. Furthermore, the receive counter circuit 6 as well as the receive addressing circuit 7, the H4-circuit 8 and the write decision circuit 9 further have a connection to the management storage of the system management.

The H4-circuit 8 determines to which of the four frames the supplied data byte belongs. For this purpose, the H4-circuit 8 is supplied with the structure code B and the data bytes from the cache memory 3 and the pointer DAT from the receive pointer circuit 5. The H4-circuit 8 supplies the value $H4_{akt}(B,n)$ to the receive addressing circuit 7.

In the receive addressing circuit 7 the TU-code, the pointer address PA, the buffer address PS, a pointer identification V1, V2, V3P and V4 and a position indicator TUPOS are formed. The position indicator TUPOS provides the value of one of the position counters TU3POS(B), TU2POS(B), TU12POS(B) or TU11POS(B). The pointer identifications V1 to V4 identify which pointer byte is available and whether there is a positive justification opportunity.

The write decision circuit 9, which receives from the receive pointer circuit 5 the structure code B from the cache memory 3 and the J1-identification, the indicator DAT, the pointer value and a message whether there is a justification action, produces a write command and the indicator J1D. For forming the buffer address PS the write decision circuit 9 applies to the receive addressing circuit 7 the count of a write counter. For a VC-4 there is a write counter VC4SC, for each VC-3 a write counter VC3SC(B) and for each of a maximum of 84 low bit rate containers a write counter LOSC(PA) available. In one AU-4 or three AU-3s a total of 84 C-11s can be transported.

Said circuits 6 to 9 may be parts of an application-specific integrated circuit (ASIC) or processor elements which are designed by means of specific design languages in a computer (cf. e.g. "ASIC-Entwurf mir VHDL und Logiksynthese" by D. Peer, Elektronik 23, 1991, pp. 84 to 92). The function of such circuit elements can therefore be explained in a more simple manner by way of state or program routines.

In the following the state routines for arrangements in the writing circuit 4 will be described which are shown in appendix A. Firstly in the receive counter circuit 6 of the writing circuit 4 it there is determined where each data byte supplied by the cache memory 3 is to be accommodated in the STM-1 frame. In an administrative unit AU-4 three AU-3s are mapped in an alternating fashion from one column to the next. Thus, the bytes of three consecutive columns each time belong to a different AU-3. Each AU is assigned to a structure. An AU-4 is completely incorporated in an AUG. The latter is also subdivided into three structures. Each third column is assigned to the same structure. The columns 0, 3, 6 and so on belong to the structure 0, the columns 1, 4, 7 and so on belong to the structure 1 and the columns 2, 5, 8 and so on belong to the structure 2.

In the receive counter circuit 6 it is first tested after the start whether the indicator DAT provided by the receive pointer circuit 5 equals 1, thus whether valid data are present. If no valid data are present, a return is made to the start. In the other case it is tested whether the J1-identification, also provided by the receive pointer circuit 5, is present. The J1-identification indicates the beginning of a VC-4 in an AU-4 or of a VC-3 in an AU-3. If the J1-identification is present, the next thing to test is whether an AU-4 is supplied. This information can be supplied by the management storage. If an AU-4 is present, an initialization is effected in the initializing routine (Appendix A) for each of the three structures (the J1-identification is only present for the first structure). First the structure B is set to 0 and then the initializing routine is leapt to. Subsequently, the same is performed for the two other structures. If not an AU-4, but an AU-3 is present, the initializing routine is also leapt to. In that case an initialization is effected for the actual structure.

If no J1-identification is present, there is tested by an interrogation of the management storage whether an AU-4 is supplied. If this is the case, counter routine 1 (Appendix A) is leapt to. In case an AU-3 is present, counter routine 2 (Appendix A) is leapt to.

In the following the initializing routine will be explained. After the start, the column counter AUS(B), the row counter AUZ(B), the counters TUG2(B), TU11(B), TU12(B) and the position counter TU3POS(B) are initialized for the structure concerned. The column counter AUS(B) and the row counter AUZ(B) are given the value of 0. The count of the counter TUG2(B), which identifies one of seven TUG-2s, is set at 6. The count of the counter TU11(B), which identifies one of four TU-11s, is given the value of 3. The count of the counter TU12(B), which identifies one of three TU-12s, is given the value of 2. The count of the position counter TU3POS(B), which identifies a data byte of a TU-3, is given the value of 594. A TU-3 carries 765 data bytes (compare FIG. 3.8/G709). The value of 594 relates to the end of a TU-3 in a VC-4. The position counter TU3POS(B) has, as have all counters mentioned and still to be mentioned, the count 0 as its counting value.

The three further position counters TU2POS(B), TU12POS(B) and TU11POS(B), which determine the position of a data byte in a TU-2, TU-12 or a TU-11 respectively, are not initialized until the first of four frames is present. The indicator H4$_{akt}$(B,n) provides information on this, which information is supplied by the H4-circuit 8. If the indicator H4$_{akt}$(B,n) is equal to 0, the first frame is present and the count of the position counter TU2POS(B) is given the value of 320 (438 bytes per container TU-2; byte 320 identifies the end of a TU-2; compare FIG. 3.11/G709), the count of the position counter TU12POS(B) is given the value of 104 (140 bytes per container TU-12; byte 104 identifies the end of a TU-12; compare FIG. 3.11/G709) and the count of the position counter TU11POS(B) is given the value of 77 (104 bytes per container TU-11; byte 77 identifies the end of a TU-11; compare FIG. 3.11/G709). If another frame is present (indicator H4$_{akt}$(B,n)≠0), the end is leapt to.

Next the counter routine 1 will be described which is started if an AU-4 is present. After the start the routing tests whether the count of the column counter AUS(B) is equal to 86, thus whether the last data byte at the end of a row can be processed (87 columns per structure). If so, the count of the column counter AUS(B) is set to 0. Then the count of the row counter AUZ(B) is incremented by unity. When the count is equal to 9 it is reset to 0. The row counter in this case again identifies the first row of a VC-4. If the count of the column counter AUS(B) is not equal to 86, it is incremented by unity.

A VC-4 is capable of transporting three TUG-3s either with one TU-3 or with seven TU-2s. The position of the data byte in the VC-4 will be determined in the following for any possible combination. First this is determined in a TU-3. A test is performed to determine whether the count of the column counter AUS(B) exceeds 1. If not, the TU-indicator TU3D(B) is set to 0. This means that no TU-3 data are present. For that matter, data of a TU-3 are not present until the third column of each structure (compare FIG. 2.4 and FIG. 2.5/G709). Otherwise the TU-indicator TU3D(B) is set to 1 and then the count of the position counter TU3POS(B) is incremented by unity. At the count of 765 the position counter TU3POS(B) starts counting again at 0 (765 bytes per TU-3).

Furthermore, the routine tests whether a pointer byte or a positive or negative justification opportunity occurs. First it is verified whether the count of the column counter AUS(B) is equal to 1. If not, the three pointer indicators H1TU3(B), H2TU3(B) and H3TU3(B) are set to 0. Then it is verified whether the count of the column counter AUS(B) is equal to 2 and the count of the row counter AUZ(B) is equal to 2. If they are not, the pointer indicator H3TU3(B) is set to 0. Otherwise, the pointer indicator H3TU3(B) is set to 1. This indicates that there is a positive justification opportunity. If the count of the column counter AUS(B) is equal to 1, it is verified whether the count of the row counter AUZ(B) is equal to 0. If it is, the first row is present and the pointer indicator H1TU3(B) is set to 1. If the count of the row counter AUZ(B) is unequal to 0, the next verification is whether the count of the row counter AUZ(B) is equal to 1. If it is, the pointer indicator H2TU3(B) is set to 1. If it is not, a last verification is made whether the count of the row counter AUZ(B) is equal to 2. If the data byte is in the third row, a pointer indicator H3TU3(B) is made equal to 1. The pointer indicators H1TU3(B), H2TU3(B) and H3TU3(B) indicate, if they have been set to 1, that there are pointer locations H1 and H2 and a negative justification opportunity (H3).

The next thing is that the position of the dam byte is determined if TU-2s are present. First a verification is made of whether the count of the column counter AUS(B) exceeds 2. If it does not, the TU indicator TUG2D(B) is set to 0 i.e. there are no data available of a TUG-2 and thus of a TU-2. In the other case the TU indicator TUG2D(B) is set to 1 (compare FIG. 2.4 and FIG. 2.7/G709). Subsequently, a verification is made which TUG-2 is present. It is then verified whether the count of the counter TUG2(B) is equal to 6. If this is not the case, the count of the counter TUG2(B) is incremented by unity; in the other case it is set to 0 and there is verified whether the count of the column counter AUS(B) is less than 10 and the count of the row counter AUZ(B) is equal to 0. This verification and the subsequent instructions or verifications respectively, are only performed for the first TUG-2. For the other six TUG-2s similar results will be obtained. If the last verification has a positive result, the part of a TUG-2 containing the TU-2 pointers is present. In this case the pointer indicator VTU2(B) is set to 1 and in the other case set to 0. If the pointer indicator VTU2(B) is equal to 0, the data byte is not situated in the pan of the TUG-2 where pointers of TU-2 occur. After the pointer indicator VTU2(B) has been set to 0, the count of the position counter TU2POS(B) is incremented by unity. At the count of 428 the position counter TU2POS(B) again starts counting at 0. A TU-2 contains 428 bytes in 4 frames (without a pointer; compare FIG. 3.11/6709). Subsequently, there is tested whether the count of the column counter AUS(B) is less than 17 and the count of the row counter AUZ(B) is equal to 0. If this is the case, the pointer indicator VTU2P(B) is set to 1 and in the other case set to 0. This pointer indicator VTU2P(B) identifies the positive justification opportunities of the TU-2 which occur in the columns 10 to 16 and in each first row. This assignment is only valid for the third of the four frames.

Once the data positions or pointer positions for a TU-2 in a TUG-2 have been determined, next the pointer positions or data positions respectively of a TU-11 in a TUG-2 are determined. There is first verified whether the count of the column counter AUS(B) exceeds 2 and the counter TUG2(B) is equal to 0. As mentioned hereinbefore, data of a TUG-2 do not occur until in the fourth column. If the verification shows that the count of the column counter AUS(B) is less than or equal to 2 and the count of the counter TUG2(B) is unequal to 0, label 11 is jumped to. In the other case a verification is made whether the count of the counter TU11 (B) is equal to 3. If the result of the verification is negative, the count of the counter TU11 (B) is incremented by unity. If the result is positive, the count of the counter TU1 i(B) is set to 0. The following instructions and inquiries are thus made only for the first TU-11 in a TU-2. Subsequently, it is verified whether the count of the column counter AUS(B) is less than 31 and whether the count of the row counter AUZ(B) is equal to 0. In the first row and up to the column number 30 there are pointers V1 to V4 in a TUG-3 (compare FIG. 2.6 and FIG. 2.7/G709). If the data byte is situated in this part of the STM-1 frame, the pointer indicator VTU 11 (B) is set to 1. In another case the pointer indicator VTU11(B) is set to 0 and the count of the position counter TU11POS(B) is incremented by unity. At the count of 104 the position counter TU11POS(B) again starts counting at 0. The position counter TU11POS(B) indicates the position of a data byte in a TU-11. For ascertaining whether the data byte is located at a positive justification opportunity, it is verified whether the count of the column counter AUS(B) is less than 59 and the count of the row counter AUZ(B) is equal to 0 (compare FIG. 3.11/G709). If positive, the pointer indicator VTU11P(B) is set to 1. This assignment also holds for the third of the four frames. In the other case this pointer indicator VTU11P(B) is set to 0. Then comes label 11.

At the end of the counter routine 1 the pointer positions and the data positions of a TU-12 are determined. First it is verified whether the count of the column counter AUS(B) exceeds 2 and whether the count of the counter TUG2(B) is equal to 0. If this is the case, thus if data can be present in TU-12, it is verified whether the count of the counter TU12(B) is equal to 2. Three TU-12s can be mapped into one TUG-2. It is thus a question of determining which TU-12 is present. If the count of the counter TU12(B) is not equal to 2, the count of the counter TU12(B) is incremented by unity. In the other case the count of the counter TU12(B) is set to 0 and further instructions and verifications are made for the first TU-12. Subsequently, it is verified whether the count of the column counter AUS(B) is less than 24 and the count of the row counter AUZ(B) is equal to 0. This is to ascertain whether pointers can be present. For that matter, pointers do occur in a TUG-3 in the columns 3 to 23 in the first row. If the verification turns out positive, the pointer indicator VTU12(B) is set to 1 i.e. a V1, a V2, a V3 or a V4-byte of a TU-12 is present. If it turns out negative, the pointer indicator VTU12(B) is set to 0. Then the count of the position counter TU12POS(B) is incremented by unity. At the count of 140 the position counter TU12POS(B) starts counting again at 0. The position counter TU12POS(B) indicates the position of a data byte in a TU-12. Subsequently, it is tested whether this is the part in which a positive justification opportunity may occur. It is then verified whether the count of the column counter AUS(B) is less than 45 and the count of the row counter AUZ(B) is equal to 0. In the columns 24 to 44 and in the first row positive justification opportunities may occur. If this verification turns out positive, the pointer indicator VTU12P(B) is set to 1 (This allocation is valid only for the third of the four frames). If it turns out negative, it is set to 0. After this last instruction the counter routine 1 is terminated.

In the following the counter routine 2 will be described which is used when an AU-3 is present. After the start it is verified whether the count of the column counter AUS(B) is equal to 86. If it is, the count of the column counter AUS(B) is set to 0. Then the count of the row counter AUZ(B) is incremented by unity. At the count of 9 the row counter AUZ(B) is set to 0. If the count of the column counter AUS(B) is not equal to 86, it is incremented by unity.

In a VC-3 one container C-3 or seven TUG-2s can be transported. For the transportation of a TU-11, TU-12 and TU-2 respectively in a TUG-2, the position in the STM-1 frame will be determined in the following. First the TU-2 position is determined. There is first verified whether the count of the column counter AUS(B) is equal to 0 or equal to 29 or equal to 58 (compare FIG. 2.3 and FIG. 2.9/G709). If this condition is satisfied, the TU-indicator TUG2D(B) is set to 0. In the first column of the VC-3 is the VC-3-POH, in the 30$^{th}$ row and in the 59$^{th}$ row fixed justification bytes. This denotes that said rows do not contain TUG-2 data bytes. If the condition is not satisfied, the TU-indicator TUG2D(B) is set to 1. Then there is verified whether TUG-2 is present. It is verified whether the count of the counter TUG2(B) is equal to 6. This verification is to determine the first TUG-2. If this verification turns out negative, the count of the counter TUG2(B) is incremented by unity. In the other case, the count of the counter TUG2(B) is set to 0. In that case also the first TUG-2 occurs. Only for the first TUG-2 will the following instructions and verifications be carried out.

Next it is verified whether the count of the column counter AUS(B) exceeds 7. If not, the part of a TUG-2 occurs which contains pointers of TU-2. The pointer indicator VTU2(B) is then set to 1. In the other case, the pointer indicator VTU2(B) is set to 0 and the count of the position counter TU2POS(B) is incremented by unity. Then it is verified whether the count of the column counter AUS(B) exceeds 14. If this verification has a negative result, the pointer indicator VTU2P(B) is set to 1. The pointer indicator VTU2P(B) indicates, as has already been explained, the data bytes that contain positive justification opportunities (this allocation is only valid for the third of the four frames). If the count of the column counter AUS(B) exceeds 14, the pointer indicator VTU2P(B) is set to 0.

For determining the pointer positions and data positions respectively, of a TU-11 in a TUG-2, the following part of the counter routine 2 is used. It is first tested whether the count of the counter TUG2(B) is equal to 0. If this is not the case, a label 12 is leapt to. If this is the case, it is verified whether the count of the counter TU11(B) is equal to 3. If not, the count of the counter TU11(B) is incremented by unity and in the other case set to 0. If the first TU-11 has been found (count of the counter TU11(B) is equal to 0), it is verified whether the count of the column counter AUS(B) exceeds 28. This verification and the next verifications are only performed with the first TU-11. If the result is negative, the pointer indicator VTU11 (B) is set to 1. With a positive result the pointer indicator VTU11(B) is set to 0. The data byte can thus be no pointer byte. In the following the count of the position counter TU11POS(B) is incremented by unity. At the count of 104 it is set to 0. Subsequently, it is tested whether the count of the column counter AUS(B) exceeds 57. If the count exceeds 57, no positive justification opportunity occurs and the pointer indicator VTU11P(B) is set to 0. In the other case there may be a positive justification opportunity and the pointer indicator VTU11P(B) is given the value of 1

(This allocation is also valid for the third of the four frames). Then the label 12 is proceeded with.

At the end of the counter routine 2 the pointer positions and the data positions of a TU-12 are determined. First there is verified whether the count of the counter TUG2(B) is equal to 0. If so, data of a TU-12 are present and the first TU-12 is sought. It is verified then whether the count of the counter TU12(B) is equal to 2. If the count is not equal to 2, the count of the counter TU12(B) is incremented by unity. If it is equal to 2, the count of the counter is set to 0 and further instructions and verifications are carried out. Then the part is sought in which no pointer bytes can be carried. The question is asked whether the count of the column counter AUS(B) exceeds 21. For that matter, up to the 21st column there may still be pointer bytes. If the value of 21 is not reached, the pointer indicator VTU12(B) is set to 1 and in the other case set to 0. Subsequently, the count of the position counter TU12POS(B) is incremented by unity. Finally, positive justification opportunities are sought. Positive justification opportunities may occur in the columns 22 to 42. Therefore, it is verified whether the count of the column counter AUS(B) is less than 43. If this is the case, the pointer indicator VTU12P(B) is set to 1 (This allocation is also valid only for the third of the four frames) and in the other case set to 0. This last instruction terminates the counter routine 2.

Once there has been established in the receive counter circuit 6 where the data byte can be mapped into the AU-payload, a buffer address PS for a data byte and a pointer address PA, formed in the receive addressing circuit 7, and specific counts and indicators or identifications are assigned to the data byte. First, however, a TU-code is set to 0. This indicates that no data of a TU-3, TU-12 or TU-11 occur. Then there is tested whether a VC-4 is present. This information is taken from the management storage. If a VC-4 is present, the buffer address PS is set to the contents of a write counter VC4SC. The count of this write counter VC4SC is incremented by unity after each data byte. Furthermore, a pointer address PA is set to "00111BB". The two "B"s are reserved for the structure. If there is no VC-4, it is verified whether there is a VC-3 in an AU-3. This information also comes from the management storage. If this verification has a positive result, the buffer address PS is set to the contents of a write counter VC3SC(B). For each structure there is a write counter VC3SC(B) whose count is incremented by unity after each data byte. The pointer address PA is set to "00111BB". If the latter verification has a negative result, it is verified whether a VC-3 occurs in an AU-4. If this is the case, the buffer address PS is set to the contents of the write counter VC3SC(B) and the pointer address PA is set to "BB00000". In the other case a TUG-2 address routine is leapt to.

After the start of the receive TUG-2 address routine, an intermediate address ZW is set to "BBTTT". The two "B"s denote the structure and the three "T"s are reserved for the contents of the counter TUG2(B). Then it is learnt from the management storage whether there is a TU-2. If there is, the pointer address PA is constructed from the intermediate address and two least significant bits which have been set to 0. If there is not, it is verified with the aid of the contents of the management storage whether there is a TU-12. If there is a TU-12, the pointer address PA is constituted by a data word which contains the intermediate address ZW as most significant bits and the contents of the counter TU12(B) as least significant bits. In the other case the pointer address PA is constituted by the intermediate address ZW and the contents of the counter TU11 (B). Then, the buffer address PS is constructed from the pointer address and the contents of a write counter LOSC(PA). The pointer address then forms the most significant bits. There is a total of 84 write counters LOSC(PA) which are indicated by the pointer address. This terminates the receive TUG-2 address routine.

In the state routine of the receive addressing circuit 7 the pointer indicators determined in the receive counter circuit 6 will be assigned in the following to the pointer identifications V1, V2, V3, V3P and V4 and the contents of a position counter to a position indicator TUPOS. First there is learnt from the management storage whether there is a TU-3. If there is, the TU-code is set to 4 and the pointer indicator H1TU3(B) is assigned to the pointer identification V1, the pointer indicator H2TU3(B) to the pointer identification V2, the pointer indicator H3TU3(B) to the pointer identification V3, the pointer indicator H3TU3P(B) to the pointer identification V3P and the value 0 to the pointer identification V4. The position indicator TUPOS is set to the contents of the position counter TU3POS(B). Subsequently, the end of the receive addressing circuit is leapt to. If there is no TU-3, there is verified whether there is a VC-3 in an AU-3 or a VC-4 in an AU-4. This information is also learnt from the management storage. If there is, the pointer identifications V1, V2, V3, V3P and V4 are set to 0. In the other case them is verified whether a TU-11 occurs. If that is the case, the TU-code is set to 3, an indicator V is set to the pointer indicator VTU11(B), an indicator VP to the pointer indicator VTU11P(B) and the position indicator TUPOS is set to the contents of the position counter TU11POS(B). If there is no TU-11, them is verified whether there is a TU-12. If so, the verification is made whether the TU-code is set to 2, the indicator V is set to the pointer indicator VTU12(B), the indicator VP is set to the pointer indicator VTU12P(B) and the position indicator TUPOS is set to the contents of the position counter TU12POS(B). In the other case, there is a TU-2 for which also an assignment of the indicators V and VP is performed. The indicator V is set to the pointer indicator VTU2(B), the indicator VP is set to the indicator VTU2PCB) and the position indicator TUPOS is set to the contents of the position counter TU2POS(B). In addition, the TU-code is given the value of 0.

The next thing to do is to determine which of the four frames occurs in a TU-11, TU-12 or TU-2. This information is learnt from the H4-circuit. If the first frame occurs ($H4_{akt}(B,n)=0$), the pointer identification V1 is set to the indicator V and the remaining pointer identifications V2, V3, V3P and V4 are set to 0. If $H4_{akt}(B,n)$ is equal to 1, the second frame is present. In that case, the pointer identification V2 is equal to the pointer V and the remaining pointer identifications are set to 0. If the third frame ($H4_{akt}(B,n)=2$) is present, the pointer identification V3 is set to the indicator V and the pointer identification V3P is set to the pointer indicator VP. The other pointer identifications are given the value of 0. If $H4_{akt}(B,n)$ is not equal to 2, the data byte belongs to the fourth frame. Only the pointer identification V4 is then made equal to the indicator V. The other pointer identifications are set to 0. The latter instruction terminates the state routine of the receive addressing circuit 7.

After the state routine of the receive addressing circuit 7 the state routine of the write decision circuit 9 will be carried out. The write command is used for writing the buffer i and incrementing the count of various write counters. After the start it is learnt from the management storage whether there is a VC-4 in an AU-4. If it is, there is verified whether a J1-identification is present. This information is supplied by the receive pointer circuit 5. If the identification is present, an indicator J1D is given the value of 1. In the other case, the indicator J1D is set to 0. Subsequently, there is determined whether valid data occur (DAT=1?). Only if valid data occur will a write command be produced.

If it appears that no AU-4 containing a VC-4 is present, it is next verified whether an AU-3 containing a VC-3 is present. This information is supplied by the management storage. If this is the case, the indicator J1D is set to 1 when a J1-identification has been determined. In the other case the indicator is given the value of 0. Subsequently, if valid data occur (DAT=1) and if there is no fixed justification opportunity in the AU-3 (column counter AUS(B)$\neq$29 and $\neq$58), the write command is forced.

If it is no AU-3 containing a VC-3, there is verified whether the indicator TUPOS, which determines the position of a data byte in a container, is equal to the pointer value for a V5 or J1-byte. The pointer value is supplied by the receive pointer circuit 5. If the indicator is equal to this pointer value, the indicator J1D is given the value of 1 and in the other case the value of 0. Thereafter it is verified whether a TU-3 is present. This information is supplied by the management storage. If a TU-3 is present, a write command is given, if a) there are valid data (DAT=1) and b) the TU-indicator TU3D(B) is set to 1 and c) no positive justification action is performed or d) a negative justification action is performed. If no TU-3 is present, a write command will not be given until a) valid data (DAT=1) are present and b) the TU-indicator TUG2D(B) is equal to 1 and c) the pointer identification V1 is equal to 0 and d) the pointer identification V2 is equal to 0 and e) the pointer identification V3 is equal to 0 or a negative justification action is performed and f) the pointer identification V3P is equal to 0 or no positive justification action is performed and g) the pointer identification V4 is equal to 0. At the end of the write decision circuit module there is tested whether there is a write command. If there is, the counts of the write counters VC4SC, VC3SC(B) and LOSC(PA) are incremented and the command "write buffer with data byte and indicator J1D" is given. This terminates the write decision circuit.

With the state routine of the H4-circuit 8 there is first tested whether the column counter AUS(B) is equal to 0 and the row counter AUZ(B) is equal to 5 and whether the indicator DAT is equal to 1. In each AU-4 or AU-3 the H4-byte is transported in the first column and the fifth row, which byte indicates the frame number. It is first tested whether the AU-4 is present. Then, an H4-value is determined for each structure code of the AU-4(B=1, 2, 3) and for each structure in an AU-3. The frame number (H4-value) is formed from the least significant bits of the H4-byte. Subsequently, the H4-value is stored in a memory included in the H4-circuit 8. This H4-value is referenced newly received H4-value $H4_{neu}(B,n)$. This value is compared with the actual H4-value $H4_{akt}(B,n-1)$ incremented by 1. The actual H4-value denotes the frame number of the previously received VC-4 or VC-3. The variable "n" relates to the newly received actual H4-value and the actual H4-value to be determined. "n-1" relates to the relevant previous H4-value. If the newly received H4-value is equal to the actual H4-value incremented by unity, the actual H4-value is set to be equal to the newly received H4-value ($H4_{akt}(B,n):=H4_{neu}(B,n)$). If this is not the case, it is verified whether the newly received H4-value forms a sequence with the last four previously received H4-values. A sequence denotes that the four frame numbers are sent periodically. There is no sequence if, for example, first the first and then the fourth frame has been sent. If such a sequence occurs, the actual H4-value is set to be equal to the newly received H4-value ($H4_{akt}(B,n):=H4_{neu}(B,n)$). If this is not the case, the actual H4-value is incremented ($H4_{akt}(B,n):=H4_{akt}(B,n)+1$).

Figure 12:
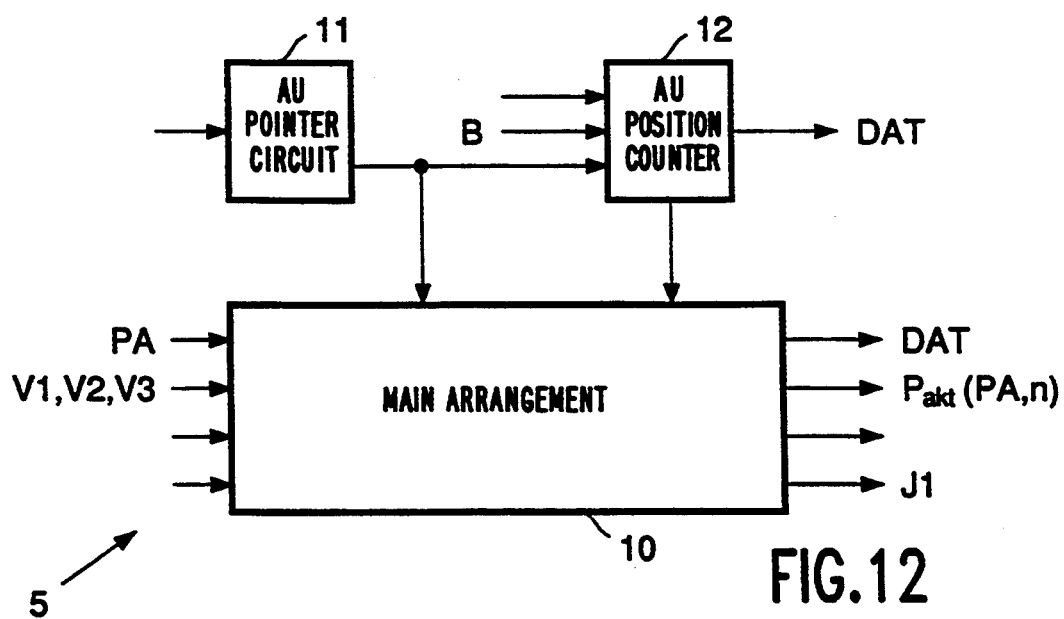
FIG. 12 shows a block diagram of a writing circuit included in the circuit arrangement as shown in FIG. 11.

FIG. 12 shows the block diagram of the receive pointer circuit 5. It comprises a main arrangement 10, an AU-pointer counter 11 and an AU-position counter 12 for counting the AU-payload bytes and the AU-pointer. The AU-pointer counter 11 receives from the cache memory 3 the AU-pointer code which identifies the start of an AU-pointer. The AU-pointer counter 11 changes its count when an AUpointer byte occurs. The count of the AU-pointer counter 11 is supplied to the main arrangement 10 and to the AU-position counter 12. The AU-position counter 12 further receives from the cache memory 3 the blocking signal and the structure code B. The count of the position counter 2 is transported to the main arrangement 10. Furthermore, the position counter 12 supplies the indicator DAT.

The main arrangement 10 in the receive pointer circuit 5 comprises a plurality of memories and counters. It receives from the write circuit 4 a pointer address PA, the pointer identifications V1, V2 and V3 and the TU-code. The pointer address PA is buffered in an address buffer. The calculation of the pointer value and whether positive or negative justification actions occur is performed with the aid of an H1V1-memory, a pointer memory, a pointer counter and a justification counter. The main arrangement 10 further includes the data bytes from the cache memory 3.

The main arrangement 10 changes as desired the indicator DAT in a negative or positive justification action. Furthermore, it supplies the information whether a justification action is provided. The calculated pointer value $P_{akt}(PA,n)$ for the TU-3, TU-2, TU-12 and TU-11 is produced as is the J1-identification for the start of a VC-4 or VC-3 container.

Appendix B describes the state routines of the receive pointer circuit 5. First the state routine of the AU-pointer counter 11 will be explained. The AU-pointer code is supplied to the AU-counter 11 from the cache memory 3 if the beginning of the AU-pointer is present. If an AU-pointer code occurs, the count (AUPO) of the AU-pointer counter 11 is set to the value of 0. Otherwise, it is verified whether the count of the AU-pointer counter 11 has the value of 12. If the value of 12 is not present, there will be a data byte of the AU-pointer or of the positive justification location. Then the count (AUPO) of the AU-pointer counter 11 is incremented by unity. In the other case no change of the contents of the AU-pointer counter 11 is made.

The state routine of the AU-pointer counter 12 shows whether valid data are present and the position of each data byte in the STM-1 frame. First it is verified whether a blocking signal is supplied by the cache memory 3. If the signal is not supplied, the indicator DAT is set to 1 i.e. valid data are present. Then a test is made whether the first structure is present i.e. whether the structure code B is equal to 0. If so, the count (AUVC) of the AU-position counter 12 is incremented by unity. The count (AUVC) of the AU-position counter 12 is only incremented when the first structure is present i.e. it counts from 0 to 782 (9 rows, 87 columns). If not, the contents of the AU-position counter 12 are not changed. If a blocking signal is present, the indicator DAT is set to 0. In that case no valid data are present. Subsequently, there is ascertained whether the first positive justification location is present. This is indicated by the AU-pointer counter 11 from the first branch. If the count (AUPO) of the AU-pointer counter 11 is equal to 9, the first positive justification location is present. Then the count (AUVC) of the AU-pointer counter 12 is set to 0. In the other case the contents of the AU-pointer counter 12 are not changed.

Subsequently, the state routine of the main arrangement 10 will be described. Once the pointer address PA supplied by the writing circuit 4 has been written, it is stored in an address buffer. The next thing to do is a test whether an H1, H2, a V1 or V2-byte is present. For this purpose, the count (AUPO) of the AU-pointer counter 11 and the writing circuit 4 are evaluated. If an H1 or H2-byte is present, the AU-pointer counter 11 indicates the counts 0 to 5. The writing circuit 4 produces a pointer identification V1 or V2 if a V1 or V2-byte is present.

If the result of the test is positive, the next thing to test is whether an H1 or V1-byte is present. If this is the case, the H1 or V1-byte is buffered in an H1V1-buffer. If the result is negative, i.e. an H2 or a V2-byte is present, an evaluation routine is leapt to.

In the following the evaluation routine will be explained. First the H1 or V1-byte from the H1V1-buffer is written followed by the newly received H2 or V2-byte. The last-received pointer value $P(PA,_{n-1})$ and the actual pointer value $P_{akt}(PA,n-1)$ are called up from the pointer memory. These pointer values are stored in a memory area of the pointer memory which is identified by the pointer address PA supplied by the writing circuit 4. The actual pointer value is the pointer value which indicates the start address of a VC-4, VC-3, TU-3, TU-2, TU-12 or TU-11. The variable "n" relates to the newly received pointer value which is still to be calculated. "n-1" relates to the previous data byte. In the following a new actual pointer value will be determined. It results from the hitherto actual pointer value, from a newly written pointer value and from the pointer value received last.

First a pointer counter PZ is incremented. Then the indicator STOPFDAT is set to 1, which indicates whether the new actual pointer value is set to the hitherto actual pointer value or the newly received pointer value. If the newly fed pointer value P(PA,n) is unequal to the last-received pointer value P(PA,n-1), the count of the pointer counter PZ is set to 1. If the opposite is true, a test is made whether the actual pointer value $P_{akt}(PA,n-1)$ is equal to the new pointer value P(PA,n). If this is the case, the count of the pointer counter PZ is set to 0. If this is not the case, first the indicator STOPFDAT is set to 0 and then a test is made whether the contents of the pointer counter PZ are equal to 3. If they are not, the actual pointer value is not changed i.e. $P_{akt}(PA,n):=P_{akt}(PA,n-1)$. If the contents of the pointer counter PZ are equal to 3, the new actual pointer value $P_{akt}(PA,n)$ is set to the new pointer value P(PA,n).

In addition to updating the pointer value it is tested in the evaluation routine whether a justification action is to be performed. In CCITT Recommendation G.709 the conditions for positive or negative justification to occur have been explained in FIG. 3.3. The pointer value consisting of ten bits has alternating I and D bits. If most of the five I bits are inverted, a positive justification action is to be performed, if most of the five D bits are inverted a negative justification action is to be performed.

A justification action will only be performed if the indicator STOPFDAT is equal to 1 i.e. the actual pointer value $P_{akt}(PA,n)$ has not yet been determined. If a justification action is to be performed, it is tested whether the contents of a justification counter SZ have the value of 3. If so, it is verified whether an H2-byte is present. This is learnt from the count (AUPO) of the AU-pointer counter 11. If an H2-byte is present, it is verified whether there is a positive justification action. If this is the case, the actual pointer value $P_{akt}(PA,n)$ is set to 0 if it is equal to 782. Otherwise the actual pointer value $P_{akt}(PA,n)$ is incremented ($P_{akt}(PA,n):=P_{akt}(PA,n-1)+1$). The actual pointer value is tested at 782 because in an administrative unit AU-3 or per structure in an administrative unit AU4 there are 783 bytes. If there is a negative justification action, the actual pointer value is decremented ($P_{akt}(PA,n):=P_{akt}(PA,n-1)-1$), if it is not 0. Otherwise the actual pointer value is set to 782. If no H2-byte is present, the hitherto actual pointer value is taken over and the count of the justification counter SZ is set to the value of 0. If the contents of the justification counter SZ are unequal to 3, no justification action is performed and the justification counter SZ is given the value of 0. If no justification action is to be performed, it is verified whether the contents of the justification counter SZ have the value of 3. If this is the case, the contents of the justification counter SZ are not changed. In the other case the justification counter SZ is incremented. This terminates the evaluation routine.

Once the evaluation routine has been terminated, in the state routine of the main arrangement of 10, the actual pointer value $P_{akt}(PA,n)$ and the new pointer value P(PA,n) and the justification information whether positive, negative or no justification at all is needed, is stored in the pointer memory.

The next part of the state routine of the main arrangement 10 determines whether there is an H3 or V3-byte and where the position of the J1-byte is. So no H1, H2, V1 or V2-byte is present. Then there is verified whether them is an H3-byte. This is determined on the basis of the count (AUPO) of the AU-pointer counter 11. If an H3-byte is present, it is verified whether there is a negative justification byte. If them is no negative justification byte, the indicator DAT is set to 0 and the end is leapt to. Then there are thus no data in the H3-pointer and neither is there a J1-byte. In the other case, the indicator DAT is set to 1 i.e. there are payload bytes at the position of the H3-pointer. Subsequently, label 21 is leapt to. If the available data byte is no H3-byte, it is verified whether there is a justification byte for an AU-3 or AU-4. The contents of the AU-pointer counter 11 in this case indicate the number 9, 10 or 11. If them is no such justification byte, label 21 is leapt to. In the other case, if them is a positive justification byte, the present indicator DAT is set to 0 i.e. there are no payload bytes and, subsequently, the end is leapt to.

Then there is the label 21. The pointer value $P_{akt}$-(PA,n) for the TU-3, TU-2, TU-12 and TU-11 and the justification information from the pointer memory are supplied to the writing circuit 4. A pointer value $P_{akt}$-(PA,n) for the AU-4 or AU-3 is not applied to the write control circuit and remains stored in the pointer memory.

Then there is determined whether the J1-byte is present. For this purpose, it is verified whether the AU-pointer value $P_{akt}$(PA,n) read from the pointer memory is equal to the contents (AUVC) of the AU-position counter 12. If so, a J1-identification is applied to the writing circuit 4.

Finally, it is determined whether a V3-byte is present. Such a V3-byte is present when the writing circuit 4 supplies the pointer identification V3. The next test whether justification actions are performed is only made if the indicator STOPFDAT is equal to 1. If this is the case, first the test is made whether there is a positive justification action. If it is, a code routine 1 (Appendix B) is jumped to. In the code routine 1, if there is a TU-3, i.e. if the TU-code supplied by the writing circuit 4 is equal to 4, the new actual pointer value $P_{akt}$(PA,n) is incremented if the hitherto actual pointer value $P_{akt}$-(PA,n-1) is not equal to 764. If the hitherto actual pointer value is 764, the new pointer value $P_{akt}$(PA,n) is set to 0. If there is a TU-2 (TU-code equal to 0), only at the count of 427 the new pointer value $P_{akt}$(PA,n) is not incremented. In that case the pointer value is set to 0. If the TU-code is equal to 2 (TU-12), the new pointer value $P_{akt}$(PA,n) is set to 0, provided that the hitherto actual pointer value $P_{akt}$(PA,n-1) is equal to 139, and otherwise incremented. With a TU-11 CFU-code equal to 3) the new pointer value $P_{akt}$(PA,n) is set to 0, if the hitherto actual pointer value $P_{akt}$(PA,n-1) is equal to 103, and otherwise incremented. After the code routine 1 has been terminated, the actual pointer value $P_{akt}$-(PA,n) is stored in the pointer memory.

If there is a negative justification action, a code routine 2 (Appendix B) is leapt to. In the code routine 2, first there is verified whether the TU-code is equal to 4, i.e. a TU-3 is present. If this is the case, there is tested whether the hitherto actual pointer value $P_{akt}$(PA,n-1) is equal to 0. If it is, the new actual pointer value $P_{akt}$-(PA,n) is set to 764, and if it is not, this value is decremented. If there is a TU-2 TU-code is equal to 0), the new pointer value $P_{akt}$(PA,n) is set to 427 if the hitherto actual pointer value $P_{akt}$(PA,n-1) is equal to 0, and otherwise decremented. If the TU-code is 2 (TU12), the new pointer value $P_{akt}$(PA,n) is set to 139 if the hitherto actual pointer value $P_{akt}$(PA,n-1) is equal to 0, and otherwise decremented. If there is a TU-11 (TU-code is equal to 3), the new pointer value $P_{akt}$(PA,n) is decremented, if the hitherto actual pointer value $P_{akt}$(PA,n-1) is unequal to 0, and otherwise, if the hitherto actual pointer value $P_{akt}$(PA,n-1) is equal to 0, the new actual pointer value $P_{akt}$(PA,n) is set to 103. This terminates the state routine of the main arrangement 10.

An incrementation or decrementafion of the pointer value in the code routine 1 or 2 is not effected until the H3-pointer byte of a TU-3 or the V3-pointer byte of a TU-2, TU-12 or TU-11 has occurred. If the evaluation of the H1, V1 and H2, V2-pointer byte respectively shows that there is a positive or negative justification action and the actual pointer value occurs after the H2, V2-pointer byte and before the H3, V3-pointer byte, the actual pointer value will not be incremented or decremented until the occurrence of the H3 or V3-pointer byte respectively. The negative or positive justification does not affect the beginning of the relevant transport unit until there is the H3 or V3-pointer byte respectively.

Figure 14:
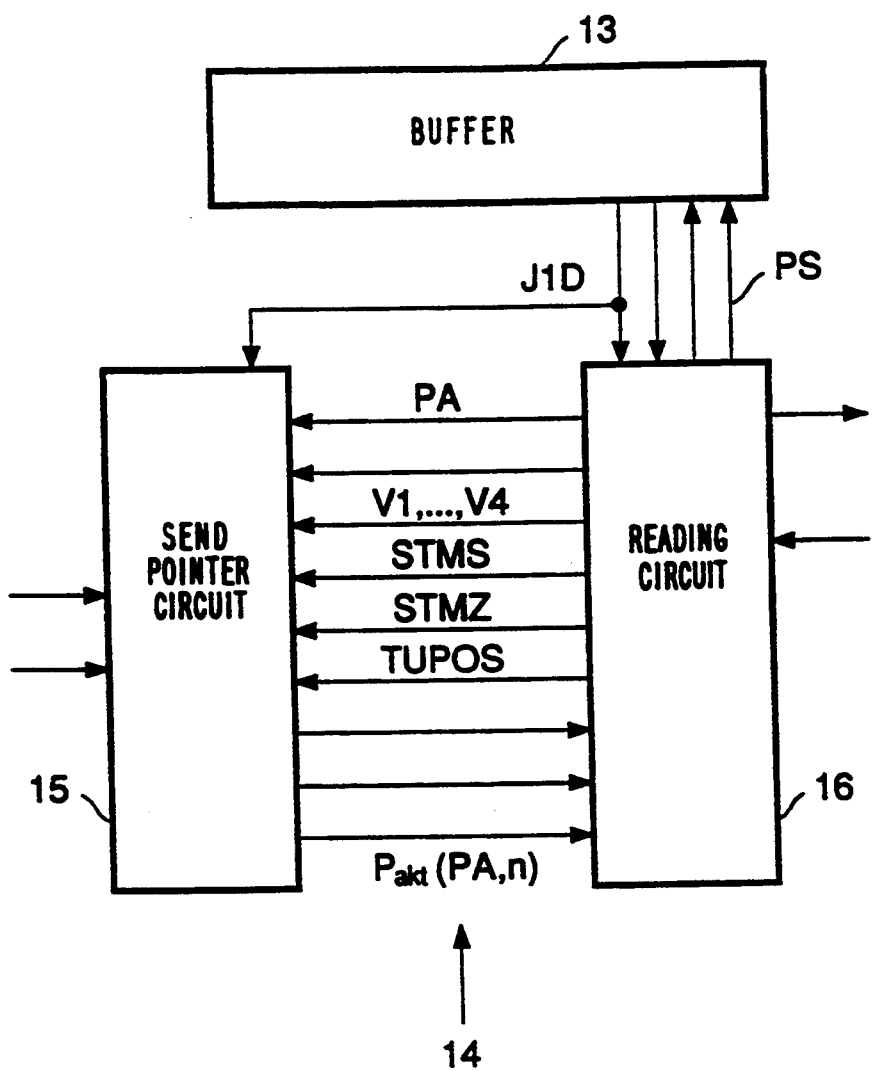
FIG. 14 shows a second exemplary embodiment for a circuit arrangement according to the invention.

A second exemplary embodiment of the circuit arrangement according to the invention for controlling a buffer 13 for a reading operation is shown schematically in FIG. 14. The buffer 13 is controlled by a send control circuit 14 and receives therefrom a read command and a buffer address PS. The buffer 13 supplies to the send control circuit the payload bytes and the indicator value J1D stored at the buffer address PS. Furthermore, the send control circuit 14 receives data from a management storage of the system management and justification bytes from a justification decision circuit (not shown) which is known, for example, from German Patent Application P 41,08,429. The reading circuit then supplies output data to the circuit that is not shown which circuit combines the output data with SOH data.

The send control circuit 14 comprises a send pointer circuit 15 and a reading circuit 16. The reading circuit 16 supplies to the send pointer circuit 15 a pointer address PA, a TU-code, pointer identifications V1, V2, V3, V3P and V4, the count of an STM-column counter and STM-row counter and a position indicator TUPOS. The send pointer circuit 15 supplies to the reading circuit 16 the H1, H2, V1 and V2-bytes. Furthermore, it is announced when there is a positive or negative justification and the pointer value.

Figure 15:
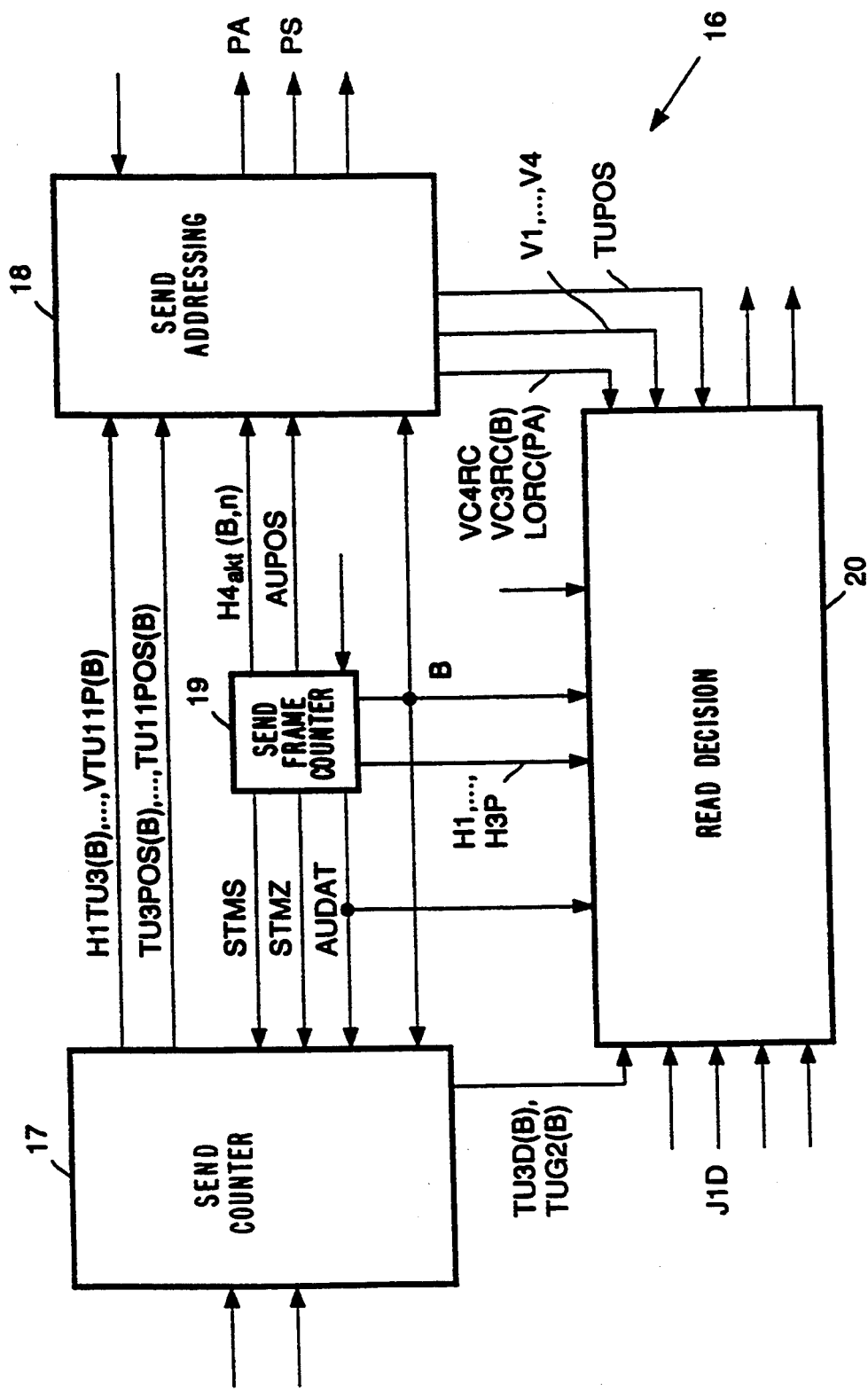
FIG. 15 shows a block diagram of a reading circuit included in the circuit arrangement shown in FIG. 14.

FIG. 15 shows a block diagram of the reading circuit 16 which comprises a send counter circuit 17, a send addressing circuit 18, a send frame counter circuit 19 and a read decision circuit 20. A send counter circuit 17 is arranged in like manner to the receive counter circuit 6. It comprises three counter stages allocated to one structure. Each counter stage comprises a column counter AUS(B), a row counter AUZ(B), a counter TUG2(B), a counter TU11(B) and a counter TU12(B). Furthermore, there are four position counters TU3-POS(B), TU2POS(B), TU12POS(B) and TU11POS(B) present in each counter stage. These counters have like functions to the counters in the receive counter circuit 6. On the basis of the various counts the send counter circuit 17 sets various pointer indicators (H1TU3(B), ..., VTU12(B)), which determine whether the available data byte is a pointer byte or a justification byte. These pointer indicators are supplied to the send addressing circuit 18. Furthermore, the send addressing circuit 18 comprises the counts of the position counters.

The send counter circuit 17 receives the data bytes from the buffer 13 and data from a management storage of the system management. The send counter circuit 17 further supplies the TU-indicators TU3D(B) and TUG2(B) to the read decision circuit 20.

In the send frame counter circuit 19 there is an STM-column counter STMS, an STM-row counter STMZ, a structure counter B and a position counter AUPOS. The counters are started by the system management by means of individual start identifications supplied periodically. The STM-column counter counts the columns of the STM-1 frame and the STM-row counter the rows of the STM-1 frame. The structure counter assigns one of three structures to each column and supplies its count as structure code B to the send counter circuit, the send addressing circuit 18 and the read decision circuit 20. The position counter AtlPOS counts in an STM-1 frame the positions in an AU-payload structure with the structure code B=0. The counts of the STM-column counter and the STM-row counter are further supplied to the send counter circuit 17. Furthermore, an indicator AUDAT is produced in the send frame counter circuit 19 which indicator identifies the data bytes of the AU-payload. This indicator AUDAT is supplied to the send counter circuit 17 and the read decision circuit 20. The send frame counter circuit 19 indicates which of the four frames is present. For this purpose, it produces the value $H4_{akt}(B,n)$ which is supplied to the send addressing circuit 18. Furthermore, the send frame counter circuit 19 supplies a pointer identification H1, H2, H3 and H3P for the AU-pointer bytes to the read decision circuit 20.

In the send addressing circuit 18 the TU-code, the pointer address PA, the buffer address PS a pointer identification V1, V2, V3, V3P and V4 and a position indicator TUPOS are formed. The position indicator TUPOS provides the value of one of the position counters TU3POS(B), TU2POS(B), TU12POS(B) or TU11POS(B). A pointer identification V1 to V4 identifies which pointer byte is present and whether there is a positive justification opportunity.

The read decision circuit 20, which receives data bytes and the indicator J1D from the buffer 13, H1, H2, V1 and V2-bytes and an announcement about a justification opportunity from the send pointer circuit 15, produces a read command and output data bytes. For forming the buffer address PS, the read decision circuit 20 supplies to the send addressing circuit 18 the count of a read counter. Similarly to the write decision circuit 9, the read decision circuit 20 comprises a read counter VC4RC for a VC-4, a write counter VC3RC(B) for each VC-3 and a write counter LORC(PA) for a maximum of 84 low bit rate containers. In addition, an AU-3 column counter AU3S(B) is present which counts the columns of an AU-3.

The circuits 17 to 20 may also be part of an application specific integrated circuit (ASIC) or processor elements which will be further explained in the following by way of a state routine.

First the send frame counter circuit will be described by means of the state routine shown in Appendix C. When there is a start identification periodically applied to the send frame counter circuit by the system management, the count of the STM-column counter STMS, of the STM-row counter STMZ and of the structure counter B is set to 0. The position counter AUPOS is set to 521 (The value 521 represents the position of the last byte in the previous frame for the first structure). The indicator $H4_{akt}(B,n)$ is incremented. At the value of 4 the indicator $H4_{akt}(B,n)$ is set to 0. If there is no start identification, the STM-column counter STMS is incremented to the value of 270. Then the STM-column counter STMS is set to 0. If the STM-column counter STMS is equal to 0, the row counter STMZ is incremented by unity to the value of 9. Then this column counter is set to 0. The structure counter is also incremented when there is no start identification. The structure counter represents a modulo-3 counter which is set to 0 when the count is 3. With the counters described thus far a column and a row in the STM-1 frame are identified and so is their structure by means of a structure code B.

The next thing is that the pointer identifications H1, H2, H3 and H3P are formed which identify the pointer bytes in the AU-pointer. If the count of the STM-row counter STMZ is equal to 3, it is tested to which column the available data byte belongs. If the STM-column counter STMS shows 0, 1 or 2, the pointer identification H1 is set to 1 and otherwise set to 0, if the STM-column counter STMS is equal to 3, 4 or 5, the pointer identification H2 is set to 1 and otherwise set to 0, if the STM-column counter STMS is equal to 6, 7 or 8, the pointer identification H3 is set to 1 and otherwise set to 0 and if the STM-column counter STMS shows 9, 10 or 11, there is a positive justification opportunity and the pointer identification H3P is set to 1 and otherwise set to 0. Finally, an indicator AUDAT is set to 1 if the STM-column counter STMS shows more than 8. In the other case the pointer AUDAT is assigned the value of 0. The indicator AUDAT identifies the structure for valid send data and excludes the SOH of the STM-1 frame and the AU-pointer structure. Then it is tested whether the indicator AUDAT is equal to 1 and the structure code B is equal to 0. If this is the case, the position counter AUPOS is incremented. At the value of 783 the count of the position counter is set to 0.

In the following the state or program routine of the send counter circuit 17 will be described. After the start there is verified whether the pointer AUDAT is equal to 1. If this is not the case, the start is looped back to. In the other case there is verified whether the count of the STM-column counter STMS is equal to 9 and the count of the STM-row counter STMZ is equal to 3. If this is the case, the initializing routine is leapt to, which has been described with respect to the state routine of the receive counter circuit 6 (Appendix A). The counters of the individual counter stages in the send counter circuit 17 are thus initialized immediately after the occurrence of the AU-pointer bytes. If immediately after the AU-pointer byte there is no data byte, there is verified whether the structure code B is equal to 0. If so, it is verified whether there is an AU-4. This information is received from the management storage. If this is the case, the counter routine 1 (Appendix A) is leapt to, which has also been used in the receive counter circuit 6. In the other case, the counter routine 2 (Appendix A) is leapt to, which has also been described with respect to the receive counter circuit 6. If the structure code B is unequal to 0, a loop back is made to the start, and the program routine of the send counter circuit 17 is terminated. The send counter circuit 17 needs to have only a single counter stage because the individual structures within the STM-1 frame are not offset i.e. a calculation is made for only the first structure (structure code B=0).

In addition to the TU-code a pointer address PA and a buffer address PS are formed in the send addressing circuit 18 for a data byte. In the state routine of the send addressing circuit 18 first the TU-code is set to 0. Subsequently, it is verified whether there is a VC-4 (from management storage). If this is the case, the buffer address PS is set to the count of the read counter VC4RC and the pointer address PA to "00111BB". The two letters "B" are reserved for the structure. If there is no VC-4, it is verified whether there is a VC-3 in an AU-3 (from management storage). If there is, the buffer address PS is set to the count of the read counter VC3RC(B) and the pointer address PA to "00111BB". If no VC-3 is transported in an AU-3 either, there is verified whether a VC-3 is transported in an AU-4 (from management storage). If it is, the buffer address PS is set to the count of the read counter VC3RC(B) and the pointer address PA to "BB00000". If the result of this verification is also negative, the send TUG-2 address routine (Appendix C) is leapt to.

First, after the start of the send TUG-2 address routine, an intermediate address ZW is set to "BBTFT". The two "B"s stand for the structure and the three "T"s are reserved for the count of the counter TUG2(B). If there is a TU-2 (from management storage), the pointer address PA becomes equal to the intermediate address and two least significant bits which are set to "0". If there is no TU-2, the management storage states whether there is a TU-12. If there is, a data word is formed to be the pointer address PA, which word has as its most significant bits the intermediate address ZW and as its least significant bits the count of the counter TU12(B). If it is no TU-12, there is a TU-11. The pointer address PA is then formed by the intermediate address and the count of the counter TU11(B). Subsequently, the buffer address PS is formed from the pointer address PA and the count of the read counter LORC(PA). The pointer address then forms the most significant bits. This terminates the send TUG2 address routine.

Thereafter, the pointer position indicators determined in the send counter circuit 17 are assigned to the pointer identifications V1, V2, V3, V3P and V4 and the count of a position counter to the position indicator TUPOS in the send addressing circuit 18. First, with the aid of the management storage, there is tested whether it is a TU-3. If there is, the TU-code is set to 4 and the pointer indicator H1TU3(B) is assigned to the pointer identification V 1, the pointer indicator H2TU3(B) to the pointer identification V2, the pointer indicator H3TU3(B) to the pointer identification V3, the pointer indicator H3TU3P(B) to the pointer identification V3P and the value 0 to the pointer identification V4. The count of the position counter TUPOS(B) is further assigned to the position indicator TUPOS.

If there is no TU-3, it is verified whether there is a VC-3 in an AU-3 or a VC-4 in an AU-4. If there is, the pointer identifications V1, V2, V3, V3P and V4 are set to H1, H2, H3, H3P and 0 respectively, and the position indicator TUPOS to the count of the position counter AUPOS. In the other case, it is verified whether there is a TU-11 (from the management storage). If there is, the TU-code is set to 3, an indicator V to the pointer indicator VTU11(B), an indicator VP to the pointer indicator VTU11P(B) and the position indicator TUPOS to the count of the position counter TU11POS(B). If it is no TU-11, there is verified via the management storage whether there is a TU-12 available. If this is the case, the TU-code is set to 2, the indicator V is set to the pointer indicator VTU12(B), the indicator VP is set to the pointer indicator VTU12P(B) and the position indicator TUPOS is set to the count of the position counter TU12POS(B). In the other case the TU-code is given the value 0, the indicator V is given the value of the pointer indicator VTU2(B), the indicator VP the value of the pointer indicator VTU2P(B) and the position indicator TUPOS the count of the position counter TU2POS(B).

In the following the indicators V and VP will be assigned to the pointer identifications V1 to V4. For this purpose, there is to be determined which frame is present. If the first frame is present ($H4_{akt}(B,n)=0$), the pointer identification V1 is set to the indicator V and the remaining pointer identifications are set to 0. If the second frame is present ($H4_{akt}(B,n)=1$), the pointer identification V2 is set to the indicator V and the remaining pointer identifications are set to 0. If the third frame is present $H4_{akt}(B,n)=2$) the pointer identification V3 is set to the indicator V and the pointer identification V3P is set to the indicator VP. The other indicators are given the value 0. If the fourth frame is present, the pointer identification V4 is assigned to the indicator V and the value 0 is assigned to the other pointer identifications. With this last instruction the state routine of the send addressing circuit 18 is terminated.

In the following the state routine of the read decision circuit 20 (Appendix C) will be described. Here the write command for writing the buffer 13 will be carried out as will an incrementation of the count of various counters. After the start there is learnt from the management storage whether a VC-4 is present in an AU-4. If so, it is tested whether the structure code B is equal to 0. If it is, the next thing to be tested is whether the pointer identification H1 is equal to 1. In that case, the first byte of the AU-pointer is present. If the pointer identification H1 is equal to 1, the H1-byte supplied by the send pointer circuit 15 is used as an output data byte. If the pointer identification H1 is not equal to 1, it is verified whether the pointer identification H2 is equal to 1. If that is the case, the H2-byte produced by the send pointer circuit 15 is used as an output data byte. If also the pointer identification H2 is unequal to 1, a read command is produced each time for three data bytes, if a) the indicator AUDAT is equal to 1 and there is no positive justification action, or b) if there is a negative justification action.

If the structure code B is unequal to 0, it is first verified whether the pointer identification H1 is equal to 1. If this is the case, the output data are given fixed values (Y-bytes) (compare FIG. 3.1/G.709). If the pointer identification H1 is unequal to 1, it is tested whether the pointer identification H2 is equal to 1. If that is the case, the output data are given further fixed values i.e. all bits are set to 1 (compare FIG. 3.1/G.709).

The next thing to do then is to verify whether the read command is present. If it is, it is verified whether the indicator J1D which is supplied by the buffer circuit 13 is equal to 1. If this is also the case, with the first structure i.e. when the structure code B is equal to 0, the count of the read counter VC4RC is incremented. At a count of 64 the read counter VC4RC is set to 0. If the second structure is present i.e. the structure code B is equal to 1, the read counter is incremented by two. This may be effected once the circuit arrangement has been switched on, if the indicator J1D is assigned to the second structure. In the other case, if the indicator J1D is assigned to the third structure (structure code B=2), no incrementation of the read counter is effected. A correction of the first structure is achieved by non-counting. If the indicator J1D is unequal to 1, the modulo-64 read counter VC4RC is incremented. The buffer data will then be supplied as output data.

The next thing to be verified is whether a VC-3 is present in an AU-3. This information is also supplied by the management storage of the system management. If there is a VC-3 in an AU-3, there is verified whether the pointer identification H1 is equal to 1. If it is, the H1 byte supplied by the send pointer circuit is taken as an output data byte. In the other case there is verified whether the pointer identification H2 is equal to 1. If it is, the H2-byte from the send pointer circuit 15 is used as an output data byte. If the pointer identification H2 is unequal to 1, a leap is made to an auxiliary routine (Appendix C).

Here there is first verified (auxiliary routine) whether a) the indicator AUDAT is equal to 1 and whether there is a positive justification action or b) there is a negative justification action. If the answer is yes, an AU-3 column counter AU3S(B) is incremented. At a count of 87 of the AU-3 column counter AU3SCB) this counter is set to 0. This AU-3 column counter AU3S(B) identifies a column in an AU-3 (compare for this purpose FIG. 2.3/G709). For ascertaining whether it is fixed justification, there is verified whether the AU-3 column counter AU3S(B) is equal to 29 or 58. If this is not the case, a read command is produced and the read counter (VC3RC(B) is incremented. At the value of 32 the read counter VC3RC(B) is set to 0. Then the data byte of the buffer 13 is used as an output data byte. At the end of the auxiliary routine it is verified whether the indicator J1D is equal to 1. If it is, the AU-3 column counter AU3S(B) is set to 0 (initialization). This terminates the auxiliary routine.

The next step in the state routine of the read decision circuit 20 is a verification with the aid of the management storage whether there is a TU-3. If there is, it is verified whether a) the indicator ALIDAT is equal to 1 and b) the indicator TU3D(B) is equal to 1 and no positive justification action is performed or c) whether there is a negative justification action. If this is the case, a read command is produced and the read counter VC3RC(B) is incremented by unity. At a count of 32 this read counter VC3RC(B) is set to 0. Then the data byte read from the buffer 13 is used as an output data byte. If there is no TU-3, it is verified whether a) the indicator AUDAT is set to 1, and b) the indicator TUG2DCB) is set to 1 and c) the pointer identification V1 is set to 0 and d) the pointer identification V2 is set to 0 and e) the pointer identification V3 is set to 0 or whether there is a negative justification action and f) the pointer identification V3P is set to 0 or whether there is no positive justification action and g) the pointer identification V4 set to 0. If this requirement is satisfied, a read command is produced and a read counter LORC(PA) is incremented which is assigned to the readout data byte. Furthermore, the data byte is issued as an output data byte. A read counter LORC(PA) is a modulo-12 counter. This terminates the state routine of the read decision circuit 20.

Finally, the state routine of the send pointer circuit 15 (Appendix D) will be described, which comprises an address buffer and a pointer memory. After the start the pointer address PA supplied by the read circuit 14 is stored in the address buffer. Then there is verified whether a pointer identification H1 or V1 is equal to 1. If this is the case, a H1V1-routine is leapt to. If this is not the case, there is verified whether the pointer identification H2 or V2 is equal to 1. If this is the case, an H2V2-routine is leapt to. If this is not the case, it is verified whether the pointer identification H3 or V3 is equal to 1. If this is the case, an H3V3-routine is leapt to. If the pointer identification H3 or V3 is not equal to 1, there is verified whether the indicator J1D is equal to 1 i.e. whether a J1 or V5-byte is assigned to the appropriate data byte from the buffer 13. If this is not the case, the end of the program or state routine of the send pointer circuit 15 is leapt to. In the other case, the value of the position indicator TUPOS is stored as a pointer value $P_{akt}(PA,n)$ in the pointer memory. This terminates the state routine of the send pointer circuit 15.

In the following the H1V1-routine (Appendix D) will be described. After the start it is first verified whether a justification action is to be performed. This information is supplied by the justification decision circuit not further represented here. If no justification is needed, an H1 or V1-byte is formed with the pointer value and the end of the H1V1-routine is leapt to. If justification is needed, the justification information is stored in the pointer memory and it is verified whether a positive justification operation is to be performed. In that case an H1 or V1-byte is formed by a pointer value with an inverted I-bit and the end of the routine is leapt to. If a negative justification operation is to be performed, the H1 or V1-byte is formed by the pointer value with an inverted D-bit.

In the H2V2-routine (Appendix D) the formation of an H2 or V2-byte is described. After the start there is verified whether a justification operation is needed. If this is not needed, the H2 or V2-byte is formed from the pointer value. In the other case, if a positive justification operation is needed, the H2 or V2-byte is formed from the pointer value with inverted I-bits. In the case of a negative justification operation, the H2 or V2-byte is formed from the pointer value with inverted D-bits. This terminates the H2V2-routine.

After the start of the H3V3-routine (Appendix D) it is first verified whether the pointer identification H3 is equal to 1. If this is the case, there is verified whether a justification operation is needed. If it is, it is verified whether a positive justification operation is needed. If it is, it is verified whether the pointer value $P_{akt}(PA,n-1)$ is equal to 782. If it is, the pointer value $P_{akt}(PA,n)$ is set to 0. In the other case, the pointer value is incremented $(P_{akt}(PA,n):=P_{akt}(PA,n-1)+1)$. In the case of a negative justification operation, there is verified whether the pointer value $P_{akt}(PA,n-1)$ is equal to 0. If it is, the pointer value $P_{akt}(PA,n)$ is set to 782. In the other case the pointer value is decremented $(P_{akt}(PA,n):=P_{akt}(PA,n-1)-1)$. If the pointer identification H3 is unequal to 1, the location for the V3-byte is available. If a justification operation is to take place, a leap is made to the code routine 1 (Appendix B) in the case of a positive justification operation and to the code routine 2 (Appendix B) in the case of a negative justification operation. These two code routines 1 and 2 have already been described during the description of the receive pointer circuit 5. Finally, the actual pointer value $P_{akt}(PA,n)$ is stored in the pointer memory. This terminates the H3V3-routine.

<u>Appendix A:</u>

<u>Receive counter circuit 6:</u>

Start:

DAT = 1?

no: back to start yes: Is J1-identification present?

yes: Is there administrative unit 4?

yes:    Set structure B: = 0, 1, 2:

Leap to initialization routine no:     Leap to an initialization routine no: Is there an administrative unit AU-4?

yes: Leap to counter routine 1 no: Leap to counter routine 2

End:

Initialization routine:

Start:

Column counter AUS(B): = 0

Row counter AUZ(B): = 0

Counter TUG2(B): = 6

Counter TU11(B): = 3

Counter TU12(B): = 2

Position counter TU3POS(B): = 594

$H4_{akt}(B,n) = 0$?

yes:    Position counter TU2POS(B): = 320

Position counter TU12POS(B): = 104

Position counter TU11POS(B): = 77

End:

Counter routine 1:

Start:

Column counter AUS(B) = 86?

yes:    Column counter AUS(B): = 0

Row counter AUZ(B): = AUZ(B)+1 MOD 9 no:     Column counter AUS(B): = AUS(B)+1

Column counter AUS(B) > 1?

no:     TU-indicator TU3D(B): = 0 yes:    TU-indicator TU3D(B): = 1

Position counter TU3POS(B): = TU3POS(B)+1 MOD 765

Column counter AUS(B) = 1?

no: Pointer indicator H1TU3(B), H2TU3(B), H3TU3(B): = 0

Column counter AUS(B) = 2 and

Row counter AUZ(B) = 2?

no: Pointer indicator H3TU3P(B): = 0 yes: Pointer indicator H3TU3P(B): = 1 yes: Row counter AUZ(B) = 0?

yes: Pointer indicator H1TU3(B): = 1 no: Row counter AUZ(B) = 1?

yes: Pointer indicator H2TU3(B): = 1 no: Row counter AUZ(B) = 2?

yes: Pointer indicator H3TU3(B): = 1

Column counter AUS(B) > 2?

no: TU-indicator TUG2D(B): = 0 yes: TU-indicator TUG2D(B): = 1

Counter TUG2(B) = 6?

no: Counter TUG2(B): = TUG2(B)+1 yes: Counter TUG2(B): = 0

Column counter AUS(B) < 10 and

Row counter AUZ(B) = 0?

yes: Pointer indicator VTU2(B): = 1 no: Pointer indicator VTU2(B): = 0

Position counter

TU2POS(B): = TU2POS(B)+1 MOD 428

Column counter AUS(B) < 17 and

Row counter AUZ(B) = 0?

no: Pointer indicator VTU2P(B): = 0 yes: Pointer indicator VTU2P(B): = 1

Column counter AUS(B) > 2 and counter TUG2(B) = 0?

no: Leap to label 11 yes: Counter TU11(B) = 3?

no: Counter TU11(B) = TU11(B)+1 yes: Counter TU11(B) = 0

Column counter AUS(B) < 31 and

Row counter AUZ(B) = 0?

yes: Pointer indicator VTU11(B): = 1 no: Pointer indicator VTU11(B): = 0

Position counter

TU11POS(B): = TU11POS(B)+1 MOD 104

Column counter AUS(B) < 59 and

Row counter AUZ(B) = 0?

yes:Pointer indicator VTU11P(B): = 1 no: Pointer indicator VTU11P(B): = 0

Label 11:

Column counter AUS(B) > 2 and counter TUG2(B) = 0?

yes:Counter TU12(B) = 2?

no: Counter TU12(B): = TU12(B)+1 yes:Counter TU12(B): = 0

Column counter AUS(B) < 24 and

Row counter AUZ(B) = 0?

yes:Pointer indicator VTU12(B): = 1 no: Pointer indicator VTU12(B): = 0

Position counter

TU12POS(B): = TU12POS(B)+1 MOD 140

Column counter AUS(B) < 45 and

Row counter AUZ(B) = 0?

yes: Pointer indicator VTU12P(B): = 1 no: Pointer indicator VTU12P(B): = 0

End:

<u>Counter routine 2:</u>

Start:

Column counter AUS(B) = 86?

yes: Column counter AUS(B): = 0

Row counter AUZ(B): = AUZ(B)+1 MOD 9 no: Column counter AUS(B): = AUS(B)+1

Column counter AUS(B) = 0 or AUS(B) = 29 or AUS(B) = 58?

yes: TU-indicator TUG2D(B): = 0 no: TU-indicator TUG2D(B): = 1

Counter TUG2(B) = 6?

no: Counter TUG2(B): = TUG2(B)+1 yes:Counter TUG2(B): = 0

Column counter AUS(B) > 7?

no: Pointer indicator VTU2(B): = 1 yes:Pointer indicator VTU2(B): = 0

Position counter

TU2POS(B): = TU2POS(B)+1 MOD 428

Column counter AUS(B) > 14?

no: Pointer indicator VTU2P(B): = 1 yes: pointer indicator VTU2P(B): = 0

Counter TUG2(B) = 0?

no: Leap to label 12 yes: Counter TU11(B) = 3?

no: Counter TU11(B): = TU11(B)+1 yes: Counter TU11(B): = 0

Column counter AUS(B) > 28?

no: Pointer indicator VTU11(B): = 1 yes: Pointer indicator VTU11(B): = 0

Position counter

TU11POS(B): = TU11POS(B)+1 MOD 104

Column counter AUS(B) > 57?

yes: Pointer indicator VTU11P(B): = 0 no: Pointer indicator VTU11P(B): = 1

Label 12:

Counter TUG2(B) = 0?

yes: Counter TU12(B) = 2?

no: Counter TU12(B): = TU12(B)+1 yes: Counter TU12(B): = 0

Column counter AUS(B) > 21?

no: Pointer indicator VTU12(B): = 1 yes: Pointer indicator VTU12(B): = 0

Position counter

TU12POS(B): = TU12POS(B)+1 MOD 140

Column counter AUS(B) < 43?

yes: Pointer indicator VTU12P(B): = 1 no: Pointer indicator VTU12P(B): = 0

End:

<u>Receive addressing circuit 7:</u>

Start:

TU-code: = 0

Is there is a VC-4?

yes: Buffer address PS: = write counter VC4SC

Pointer address PA: = "00111BB"

no: Is there a VC-3 in an AU-3?

yes: Buffer address PS: = write counter VC3SC(B)

Pointer address PA: = "00111BB"

no: Is there a VC-3 in an AU-4?

yes: Buffer address PS: = write counter VC3SC(B)

Pointer address PA: = "BB00000"

no: Go to TUG-2 address routine

Is there a TU-3?

yes: TU-code: = 4

Pointer identification V1: = H1TU3(B), V2: = H2TU3(B), V3: = H3TU3(B), V3P: = H3TU3P(B), V4: = 0 and position indicator TUPOS: = TU3POS(B)

no: Is there a VC-3 in AU-3 or VC-4 in AU-4?

yes:Pointer identification V1: = 0, V2: = 0, V3: = 0, V3P: = 0, V4: = 0 no: Is there TU-11?
yes: TU-code: = 3

Indicator V: = VTU11(B), VP: = VTU11P(B),

TUPOS: TU11POS(B)

no: Is there a TU-12?

yes: TU-code: = 2

Indicator V: = VTU12(B), VP: = VTU12P(B), TUPOS: = TU12POS(B)

no: TU-code: = 0

Indicator V: = VTU2(B), VP: = VTU2P(B), TUPOS: = TU2POS(B)

$H4_{akt}(B,n) = 0$?

yes: Pointer identification V1: = V, V2: = 0, V3: = 0, V3P: = 0, V4: = 0 no: $H4_{akt}(B,n) = 1$?

yes: Pointer identification V1: = 0, V2: = V, V3: = 0, V3P: = 0, V4: = 0 no: $H4_{akt}(B,n) = 2$?

yes: Pointer identification V1: = 0, V2: = 0, V3: = V, V3P: = VP, V4: = 0 no: Pointer identification V1: = 0, V2: = 0, V3: = 0, V3P: = 0, V4: = V

End:

Receive TUG2 address routine:

Start:

Intermediate address ZW: = "BBTTT"

Is there a TU-2?

yes: Pointer address PA: = ZW/"00"

no: Is there a TU-12?

yes: Pointer address PA: = ZW/TU12(B)

no: Pointer address PA: = ZW/TU11(B)

Buffer address PS: = PA/write counter LOSC(PA)
End:

Write decision circuit 9:

Start:

Is there an AU-4 with VC-4?

yes: Is there a J1-identification?

yes: Indicator J1D: = 1 no: Indicator J1D = 0

DAT = 1?

yes: Generation of write command no: Is there an AU-3 with VC-3?

yes: Is there a J1-identification?

yes: Indicator J1D: = 1 no: Indicator J1D: = 0

Is DAT = 1 and column counter AUS(B) $\neq$ 29 and $\neq$ 58?

yes: Generation of write command no: Is TUPOS = pointer value?

yes: Indicator J1D: = 1 no: Indicator J1D: = 0

Is there a TU-3?

yes: a) Is DAT = 1 and b) Is TU3D(B) set to 1 and c) Is there no positive justification operation d) Is there a negative justification operation?

yes: Generation of write command no: a) Is DAT = 1 and b) Is TUG-2D(B) set to 1 and c) Is V1 set to 0 and d) Is V2 set to 0 and e) Is V3 set to 0 or is there a negative justification operation and f) Is V3P set to 0 or is there no positive justification operation and g) Is V4 set to 0?

yes: Generation of write command

Is there a write command?

yes: Write counter VC4SC: = VC4SC+1 MOD 64

Write counter VC3SC(B): = VC3SC(B)+1 MOD 32

Write counter LOSC(PA): = LOSC(PA)+1 MOD 12

Data byte and indicator J1D in buffer

End:

H4-circuit 8:

Start:

Column counter AUS(B)=0 and row counter AUZ(B)=5 and DAT=1?

yes: Is there an AU-4?

yes: Set B: to 0, 1, 2:

Determination of the H4-value on the basis of the two least significant bits of the H4-byte;

Storage of the H4-value in H4-memories,

Is the newly received H4-value $H4_{neu}(B,n)$ equal to the actual H4-value $H4_{akt}(B,n-1)+1$?

yes: $H4_{akt}(B,n) := H4_{neu}(B,n)$ no: Does the newly received H4-value $H4_{neu}(B,n)$ together with the four previously received H4-values $H4_{neu}(B,n-i)$, $i = 1, ..., 4$ form a sequence?

yes: $H4_{akt}(B,n) := H4_{neu}(B,n)$ no: $H4_{akt}(B,n) := H4_{neu}(B,n-1)+1$

End:

Appendix B

Receive pointer circuit 5:

AU-pointer counter 11:

Start:

Is there an AU-pointer code?

yes: AU-pointer counter AUPO: = 0 no: Au-pointer counter AUPO = 12?

no: AU-pointer counter AUPO: = AUPO+1 yes: No change of the count of the AU-pointer counter AUPO

End:

AU-position counter 12:

Start:

Is there a blocking signal?

no: DAT: = 1

Is there a first structure (B = 0)?

yes: AU-position counter AUVC: = AUVC+1 no: No change of the count of the AU-position counter AUVC yes: DAT: = 0

Is the first positive justification byte there?

yes: AU-position counter AUVC: = 0 no: No change of the count of the AU-position counter AUVC

End:

Main arrangement 10

Start:

Storage of the pointer address PA in an address buffer:

Is there an H1, H2, V1 or V2-byte?

yes: Is there an H1 or a V1-byte?

yes: Buffering of the H1 or V1-byte in the H1V1- buffer;

no: Leap to evaluation routine

Store the actual pointer value $P_{akt}(PA,n)$ and the new pointer value $P(PA,n)$ and justification information in the pointer memory;

no: Is the H3-byte there?

yes: Is there a negative justification byte?

no: DAT: = 0

Leap to end yes: DAT = 1

Leap to label 21 no: Is there a justification location for administrative unit AU-3 or AU-4?

no: Leap to label 21 yes: Is there positive justification yes: DAT: = 0

Leap to end

Label 21:

Issue of pointer value $P_{akt}(PA,n)$ for TU-3, TU-2, TU-12, TU-11 and justification information from pointer memory to writing circuit 4;

Is the pointer value $P_{akt}(PA,n)$ read from the pointer memory for AU-4, AU-3 equal to the count of the position counter AUVC?

yes: Issue of the J1-identification

Is there a V3-byte and is STOPFDAT = 1?

yes: Is there a positive justification operation yes: Leap to code routine 1 storage of actual pointer value $P_{akt}(PA,n)$ in pointer memory;

no: Is there a negative justification operation?

no: Leap to end yes: Leap to code routine 2 storage of the actual pointer value $P_{akt}(PA,n)$ in pointer memory;

End:

Evaluation routine:

Start:

Issue of H1 or V1-byte from H1V1-memory of the newly received H2 or V2-bytes, of the previously received pointer value $P(PA,n-1)$ and the actual pointer value $P_{akt}(PA, n-$ 1) from the pointer memory;

Pointer counter PZ: = PZ+1;

STOPFDAT: = 1

Is the newly received pointer value P(PA,n) equal to the previously received pointer value P(PA,n-1)

yes: Is the actual pointer value $P_{akt}$(PA,n-1) equal to the new pointer value P(PA,n)?

yes: Pointer counter PZ: 0 no: STOPFDAT: = 0

Pointer counter PZ = 3?

no: $P_{akt}$(PA,n): = $P_{akt}$(PA,n-1)

yes: $P_{akt}$(PA,n): = $P_{akt}$(PA,n)

no: Pointer counter PZ: = 1

Is a justification operation to be performed and is STOPFDAT equal to 1?

yes: justification counter SZ: = 3?

yes: Is there an H2-byte?

yes:    Is there a positive justification operation?

yes:    Pointer value $P_{akt}$(PA,n-1) = 782?

yes: $P_{akt}$(PA,n) = 0 no: $P_{akt}$(PA,n): = $P_{akt}$(PA,n-1)+1 no: Is there a negative justification operation?

yes: Pointer value $P_{akt}$(PAn-1) = 0?

yes: $P_{akt}$(PA,n): = 782 no: $P_{akt}$(PA,n): = $P_{akt}$(PA,n- 1)-1 no: $P_{akt}$(PA,n): $P_{akt}$(PA,n-1)

Justification counter SZ: = 0 no: No justification operation to be performed

Justification counter SZ: = 0 no: Justification counter SZ = 3?

yes: Justification counter: = SZ no: Justification counter SZ: = SZ+1

End:

Code routine 1:

Start:

TU-code = 4?

yes: Pointer value $P_{akt}(PA,n-1) = 764$?

yes: Pointer value $P_{akt}(PA,n): = 0$ no: Pointer value $P_{akt}(PA,n): = P_{akt}(PA,n-1)+1$ TU-code = 0?

yes: Pointer value $P_{akt}(PA,n-1) = 427$?

yes: Pointer value $P_{akt}(PA,n): = P_{akt}(PA,n-1)+1$

TU-code = 2?

yes: Pointer value $P_{akt}(PA,n-1) = 139$?

yes: Pointer value $P_{akt}(PA,n): = 0$ no: Pointer value $P_{akt}(PA,n): = P_{akt}(PA,n-1)+1$ TU-code = 3?

yes: Pointer value $P_{akt}(PA,n-1) = 103$?

yes: Pointer value $P_{akt}(PA,n): = 0$ no: Pointer value $P_{akt}(PA,n): = P_{akt}(PA,n-1)+1$ End:

Code routine 2:

Start:

TU-code = 4?

yes: Pointer value $P_{akt}(PA,n-1) = 0$?

yes: Pointer value $P_{akt}(PA,n): = 764$ no: Pointer value $P_{akt}(PA,n): = P_{akt}(PA,n-1)-1$ TU-code = 0?

yes: Pointer value $P_{akt}(PA,n-1) = 0$?

yes: Pointer value $P_{akt}(PA,n): = 427$ no: Pointer value $P_{akt}(PA,n): = P_{akt}(PA,n-1)-1$ TU-code = 2?

yes: Pointer value $P_{akt}(PA,n-1) = 0$?

yes: Pointer value $P_{akt}(PA,n): = 139$ no: Pointer value $P_{akt}(PA,n): = P_{akt}(PA,n-1)-1$ TU-code = 3?

yes: Pointer value $P_{akt}(PA,n-1) = 0$?

yes: Pointer value $P_{akt}(PA,n): = 103$ no: Pointer value $P_{akt}(PA,n): = P_{akt}(PA,n-1)-1$ End:

Appendix C:

Send frame counter circuit 19:

Start:

Is there a start identification?

yes:  STM-column counter STMS: = 0

STM-row counter STMZ: = 0

Structure counter B: = 0

Position counter AUPOS: = 521

$H4_{akt}(B,n) := H4_{akt}(B,n-1)+1 \text{ MOD } 4$ no: STM-column counter STMS: = STMS+1 MOD 270

STM-row counter STMS: = 0 structure counter B: = 0 yes: STM-row counter STMZ: = STMZ+1 MOD 9

Structure counter B: = B+1 MOD 3

STM-row counter STMZ = 3?

yes: STM-column counter STMS = 0, 1 or 2?

yes: Pointer identification H1: = 1 no: Pointer identification H1: = 0

STM-column counter STMS = 3, 4 or 5?

yes: Pointer identification H2: = 1 no: Pointer identification H2: = 0

STM-column counter STMS = 6, 7 or 8 yes: Pointer identification H3: = 1 no: Pointer identification H3: = 0

STM-column counter STMS = 9, 10 or 11?

yes: Pointer identification H3P: = 1 no: Pointer identification H3P: = 0

STM-column counter STMS > 8?

yes: Indicator AUDAT: = 1 no: Indicator AUDAT: = 0

AUDAT = 1 and structure counter B: = 0?

yes: Position counter AUPOS: = AUPOS+1 MOD 783

End:

Send counter circuit 17:

Start:

AUDAT = 1?

no: back to start yes: STM-column counter STMS=9 and STM-row counter STMZ=3?

yes: Leap to initialization routine no: Structure counter B = 0?

yes: Is there an administrative unit AU-4?

yes: Leap to counter routine 1 no: Leap to counter routine 2 no: back to start;

End:

Send addressing circuit 18:

Start:

TU-code: = 0

Is there a VC-4?

yes: Buffer address PS: = read counter VC4RC

Pointer address PA: = "00111BB"

no: Is there a VC-3 in an AU-3?

yes: Buffer address PS: = read counter VC3RC(B)

Pointer address PA: = "00111BB"

no: is there a VC-3 in an AU-4?

yes: Buffer address PS: = read counter VC3RC(B)

Pointer address PA = "BB00000"

no: Go to send TUG-2 address routine

Is there a TU-3?

yes: TU-code: = 4

Pointer identification V1: = H1TU3(B), V2: = H2TU3(B), V3: = H3TU3(B),

V3P: = H3TU3P(B), V4: = 0 and position indicator TUPOS: = TU3POS(B)

no: Is there a VC-3 in an AU-3 or VC-4 in an AU-4?

yes: Pointer identification V1:=H1, V2:=H2, V3:=H3,

V3P:=H3P, V4:=0, TUPOS:=AUPOS no: Is there a TU-11?

yes: TU-code: = 3

Indicator V:=VTU11(B), VP:=VTU11P(B), TUPOS: =

TU11POS(B)

no: Is there a TU-12?

yes:    TU-code: = 2

Indicator V:=VTU12(B),

VP:= VTU12P(B), TUPOS: = TU12POS(B)

no: TU-code: = 0

Indicator V: = VTU2(B),

VP: = VTU2P(B), TUPOS: = TU2POS(B)

$H4_{akt}(B,n) = 0$?

yes: Pointer identification V1:=V, V2:=0,

V3:=0, V3P:=0, V4:=0 no: $H4_{akt}(B,n) = 1$?

yes: Pointer identification V1:=0,

V2:=V, V3:=0, V3P:=0, V4:=0 no: $H4_{akt}(B,n) = 2$?

yes: Pointer identification

V1:=0, V2:=0, V3:=V,

V3P:=VP, V4:=0 no: Pointer identification

V1:=0, V2:=0, V3:=0,

V3P:=0 and V4:=V

End:

Send TUG-2 address routine:

Start:

Intermediate address ZW: = "BBTTT"

Is there a TU-2?

yes: Pointer address PA: ZW/"00"

no: Is there a TU-12?

yes: Pointer address PA: = ZW/TU12(B)

no: Pointer address PA: = ZW/TU11B)

Buffer address PS: = PA/read counter LORC(PA)
End:

Read decision circuit 20:

Start:

Is there an AU-4 with VC-4?

yes: Structure code B = 0?
- yes: Pointer identification H1 = 1?
  - yes: Output data: = H1-byte
  - no: Pointer identification H2 = 1?
    - yes: Output data: = H2-byte
    - no: a) Is AUDAT = 1 and is there no positive justification operation or
      b) Is there a negative justification operation?
      - yes: Generation of read command
- no: Pointer identification H1 = 1?
  - yes: Output data: = fixed values
  - no: Pointer identification H2 = 1?
    - yes: Output data: = fixed values Is there a read command?
yes: J1D = 1?
- yes: Structure code B = 0?
  - yes: Read counter VC4RC: = VC4RC+1 MOD 64
  - no: Structure code B = 1?
    - yes: Read counter VC4RC:=VC4RC+2MOD64
    - no: Read counter VC4RC:=VC4RC+1MOD64

Output data = buffer data no: Is there an AU-3 with VC-3?
- yes: Pointer identification H1 = 1?
  - yes: Output data: = H1-byte
  - no: Pointer identification H2 = 1?
    - yes: Output data: = H2-byte
    - no: Leap to auxiliary routine
- no: Is there a TU-3?
  - yes: a) Is AUDAT = 1 and
    b) Is TU3D(B) = 1 and is there no positive justification operation or
    c) Is there a negative justification operation?
    - yes: Generation of the read command
      Read counter VC3RC(B):=VC3RC(B)+1MOD32

Output data: = buffer data no:  a) Is AUDAT set to 1 and b) Is TUG2D(B) set to 1 and c) Is V1 set to 0 and d) Is V2 set to 0 and e) Is V3 set to 0 or is there a negative justification operation and f) Is V3P set to 0 or is there no positive justification operation and g) Is V4 set to 0?

yes: Generation of the read command read counter LORC(PA):=LORC(PA)+1MOD12

Output data: = buffer data

End:

Auxiliary routine:

Start:

a) Is AUDAT = 1 and is there a positive justification operation or b) Is there a negative justification operation?

yes: AU-3 column counter AU3S(B): = AU3S(B)+1 MOD 87

AU-3 column counter AU3S(B) = 21 or AU3S(B) = 58?

no: generation of a read command

Read counter VC3RC(B): = VC3RC(B)+1 MOD 32

Output data: = buffer data

J1D = 1?

yes: AU-3 column counter AU3S(B) = 0 no: Leap to end of read decision circuit
End:

Appendix D

Send pointer circuit 15:

Start:

Storage of the pointer address PA in an address buffer

Pointer identification H1 = 1 or V1 = 1?

yes: Leap to H1V1-routine no: Pointer identification H2 = 1 or V2 = 1?

yes: Leap to H2V2-routine no: Pointer identification H3 = 1 or V3 = 1?

yes: Leap to H3V3-routine no: J1D = 1?

yes: Storage of the value of the position indicator as pointer value $P_{akt}(PA,n)$ in the pointer memory End:

H1V1-routine:

Start:

Is a justification action to be carried out?

no: Formation of H1 or V1-byte with the pointer value

Leap to end yes: Storage of justification information in the pointer memory

Is a positive justification action to be carried out?

yes: Formation of H1 or V1-byte with the pointer value with an inverted I-bit;

leap to end no: Formation of H1 or V1-byte with the pointer value with an inverted D-bit;

End:

H2V2-routine:

Start:

Is a justification action to be carried out?

no: Formation of H2 or V2-byte from the pointer value

Leap to end yes: Is a positive justification action to be carried out?

yes: Formation of H21 or V21-byte with the pointer value with inverted I-bits;

Leap to end no: Formation of H2 or V2-byte from the pointer value with inverted D-bits;

End:

H3V3-routine:

Start:

Pointer identification H3 = 1?

yes: Is a justification action to be carried out?

yes: Is a positive justification action to be carried out?

yes: Pointer value $P_{akt}(PA,n-1) = 782$?

yes: Pointer value $P_{akt}(PA,n): = 0$ no: Pointer value $P_{akt}(PA,n): = P_{akt})PA,n-1)+1$     no:

Pointer value $P_{akt}(PA,n-1) = 0$?

yes: Pointer value $P_{akt}(PA,n): = 782$ no: Pointer value $P_{akt}(PA,n): = P_{akt}(PA,n-1)-1$ no: Is a justification action to be carried out?

yes: Is a positive justification action to be carried out?

yes: Leap to code routine 1 no: Leap to code routine 2

Storage of the actual pointer value $P_{akt}(PA,n)$ in pointer memory

End:

We claim:

1. A method for determining data bytes of a signal to be received or transmitted, the signal being of a format comprising a plurality of types of high bit rate transport units and a plurality of low bit rate transport units, the method comprising executing the following steps in a control circuit:

marking, with at least one first count in counter means, pointer bytes of each possible type of high bit rate transport unit;

marking, with at least one second count in the counter means, data bytes of each possible type of high bit rate transport unit;

marking, with at least one third count in the counter means, the data bytes of a low bit rate transport unit of each possible group of low bit rate transport units, identifying payload bytes and pointer bytes based on the first, second, and third counts and on information about the transport units of the signal.

2. Method of claim 1 further comprising executing the following steps in the control circuit (2,14)

assigning a respective write or read count to each transport unit of the signal, forming a buffer address using the read or write count assigned to the payload bytes, and reading or writing the payload bytes using the buffer address.

3. The method of claim 24, further comprising the step of, in the control circuit, deducing at least pointer values from the identified pointer bytes or inserting at least pointer values into the identified pointer bytes.

4. The method of claim 2, wherein the identifying step comprises identifying AU-payload bytes, AU-pointer bytes, assigning the AU-payload bytes to the transport units, identifying TU-pointer bytes, and identifying a negative justification opportunity as a payload byte when there is a negative justification action and stopping identifying a positive justification opportunity as a payload byte when there is a positive justification action, by evaluations of at least one of the previously identified counts.

5. The method of claim 4 wherein the first count serves as a pointer identification for an AU-pointer byte or a possible justification byte when specific first counts are reached.

6. Method as claimed in claim 5, comprising performing the following steps in the control circuit (2, 14)

counting data bytes in an AU-payload structure and determining the position of the data bytes in the AU-payload structure, assigning the data bytes to TU transport units and forming a pointer identification for a TU-pointer byte or a possible justification byte on the basis of an evaluation of the counts of the counter means (6,17).

7. Method as claimed in claim 6, comprising the steps of in a VC-4 or VC-3, determining a column, using a column count of the counter means, and determining a row using a row count of the counter means, identifying payload bytes in a TU-3, using a TU-3 count of the counter means, identifying a TUG-2, using a TUG-2 count of the counter means, identifying a TU-12 in at least the TUG-2, using a TU-12 count of the counter means, identifying a TU-11 in at least a the TUG-2, using a TU-11 count of the counter means and at least each TU-2, TU-12, and TU-11, identifying respective ones of the payload bytes using respective TU-2, TU-12, and TU-11 position counts of the counter means.

8. Method as claimed in claim 7, further comprising the steps of, in an addressing circuit (7, 18)

forming the buffer address from each assigned write or read count when there is a VC-4 or a VC-3, forming the buffer address from each assigned write or read count and the TUG-2 count when there is a TU-2, and forming the buffer address from each assigned write or read counter, and the TUG-2 count and the TU-12 or TU-11 count when there is a TU-12 or TU-11.

9. Method as claimed in claim 8, further comprising in a pointer circuit (5, 15), producing a part of a pointer value from the pointer bytes or inserting a part of a pointer value into the pointer bytes when there is a pointer identification for the H1 or V1 and H2 or V2-pointer bytes respectively.

10. Method as claimed in claim 9, further comprising in the pointer circuit (5,15), storing a pointer value at a memory location identified by a pointer address after forming the pointer address using the addressing circuit (7, 18) included in the control circuit (2, 14).

11. Method as claimed in claim 10, further comprising, in the addressing circuit (7, 18), forming fixed predetermined pointer addresses for the VC-4 and VC-3, forming pointer addresses for the TU-2 which depend on the TUG-2 count, and forming pointer addresses for the TU-12 and TU-11, which addresses depend on the TUG-2 count, and on for identifying a TU-12 or TU-11]the TU-12 and TU-11 counts, respectively.

12. Method as claimed in claim 11, wherein the signal is an STM-1 signal, and comprising when an indicator for a beginning of an AU-4, AU-3, a TU-3, TU-2, TU-2, OR TU-11 is supplied, forming in the pointer circuit (15) the actual pointer value from a respective one of the previously identified counts.

13. Method as claimed in claim 4, further comprising the step of setting a newly received pointer value to be the current pointer value, if the newly received pointer value and a last-received pointer value correspond and if prior current pointer value and the newly received pointer value do not correspond.

14. Method as claimed in claim 13, further comprising, when there is a positive or negative justification action, waiting to increment or decrement the pointer values until the occurrence of an H3 or V3-pointer byte of a transport unit.

15. Method as claimed in claim 13, wherein the signal has a format which includes AU-4 and AU-3 administrative units, initializing the counts at the beginning of each AU-4 or AU-3 administrative unit.

16. Method as claimed in claim 13, further comprising issuing a blocking signal, when there are no payload data, and blocking change of an AU-position count in an AU-position counter (12) used for counting the AU-payload bytes, in response to the blocking signal.

17. Method as claimed in claim 12, further comprising, in the control circuit (2), if the current pointer value corresponds to a respective one of the counts, issuing an indicator for the beginning of each AU-4, AU-3, TU-3, TU-2, TU-12 or TU-11.

18. Method as claimed in claim 17, further comprising incrementing or decrementing the current pointer value in the case of a positive or negative justification operation.

19. Method as claimed in claim 13, further comprising, in the control circuit (2), receiving an AU-pointer code for identifying the beginning of the AU-pointer, and initializing an AU-pointer counter with the AU-pointer code.

20. Method as claimed in claim 5, further comprising, in the control circuit (2,14), wherein the signal is an STM-1 signal having frames in a send frame counter circuit, with a column count, determining a column and with a row count, determining a row in a current frame.

21. Method as claimed in claim 20, further comprising initializing counts associated with position of data bytes of transport units for reading purposes at the beginning of a $9^{th}$ column and a $4^{th}$ row in the frame of the signal.

22. Method as claimed in claim 20, further comprising using the column count and the row count in the send frame counter circuit (19) for determining pointer identifications for the AU-pointers.

* * * * *